US012400582B2

(12) United States Patent
Lim et al.

(10) Patent No.: US 12,400,582 B2
(45) Date of Patent: Aug. 26, 2025

(54) DISPLAY DEVICE AND AN ELECTRONIC DEVICE

(71) Applicant: SAMSUNG DISPLAY CO., LTD., Yongin-si (KR)

(72) Inventors: Kyoungho Lim, Yongin-si (KR); Jongha Shin, Yongin-si (KR); Daye Moon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/627,719

(22) Filed: Apr. 5, 2024

(65) Prior Publication Data

US 2024/0379048 A1 Nov. 14, 2024

(30) Foreign Application Priority Data

May 11, 2023 (KR) ........................ 10-2023-0061180

(51) Int. Cl.
*G09G 3/32* (2016.01)
*G09G 3/00* (2006.01)

(52) U.S. Cl.
CPC ............... *G09G 3/32* (2013.01); *G09G 3/007* (2013.01); *G09G 2310/021* (2013.01); *G09G 2320/02* (2013.01)

(58) Field of Classification Search
CPC .... G09G 3/32; G09G 3/007; G09G 2310/021; G09G 2320/02
See application file for complete search history.

(56) References Cited

U.S. PATENT DOCUMENTS

| | | | | |
|---|---|---|---|---|
| 10,147,401 | B2 | 12/2018 | Lee et al. | |
| 10,339,901 | B2 | 7/2019 | Lee et al. | |
| 10,559,250 | B2 | 2/2020 | Chun et al. | |
| 10,854,123 | B2 | 12/2020 | Kim et al. | |
| 2005/0204313 | A1* | 9/2005 | Enoki ...................... | G09G 3/28 348/173 |
| 2020/0211430 | A1* | 7/2020 | Kim ..................... | G09G 3/3233 |
| 2022/0301524 | A1 | 9/2022 | Lee et al. | |

FOREIGN PATENT DOCUMENTS

| | | |
|---|---|---|
| KR | 10-2020-0079867 | 7/2020 |
| KR | 10-2400350 | 5/2022 |
| KR | 10-2023-0009800 | 1/2023 |
| KR | 10-2513708 | 3/2023 |

* cited by examiner

*Primary Examiner* — Robert J Michaud
(74) *Attorney, Agent, or Firm* — F. CHAU & ASSOCIATES, LLC

(57) ABSTRACT

A display device including: a display panel including a route region located in the display region; and a drive controller configured to generate image data such that a reference point of the image is shifted along a shift route, the route region includes a center point, first to fourth points, and first to fourth sides, the shift route includes a first route that includes: a first sub-route along which the reference point moves from the center point to the first point; a second sub-route along which the reference point moves from the first point to the third point; a third sub-route along which the reference point moves from the third point to the second point; a fourth sub-route along which the reference point moves from the second point to the fourth point; and a fifth sub-route along which the reference point moves from the fourth point to an end point.

27 Claims, 20 Drawing Sheets

RT1b:P0→P1→P4→P2→P3→PEc

R2-21a, R2-22a, R2-23a, R2-24a } R2-2a

R2-41b, R2-42b, R2-43b, R2-44b, R2-45b, R2-46b } R2-4b

R2-1a, R2-2a, R2-3b, R2-4b, R2-5a } RT2b

R2-31b, R2-32b, R2-33b, R2-34b } R2-3b

R2-51a, R2-52a, R2-53a } R2-5a

RT2b:P0→P4→P1→P3→P2→PEd

DISPLAY DEVICE AND AN ELECTRONIC DEVICE

CROSS-REFERENCE TO RELATED APPLICATION

This application claims priority under 35 U.S.C. § 119 to Korean Patent Application No. 10-2023-0061180 filed on May 11, 2023, in the Korean Intellectual Property Office, the disclosure of which is incorporated by reference herein in its entirety.

TECHNICAL FIELD

Embodiments of the present disclosure described herein relate to a display device and an electronic device, and more particularly, to a display device and an electronic device with improved image quality.

DISCUSSION OF RELATED ART

An emissive display device, a type of display technology, displays an image using light emitting diodes. LEDs generate light via the recombination of electrons and holes. The emissive display device has a high response speed and has low power consumption.

The emissive display device includes a display panel composed of pixels connected to data lines and scan lines. In general, each pixel includes a light emitting diode and a pixel circuit unit. The pixel circuit unit controls the amount of current flowing to the light emitting diode, in response to a data signal. Consequently, the light emitting diode emits light having a predetermined luminance depending on the amount of current flowing through the light emitting diode.

SUMMARY

Embodiments of the present disclosure provide a display device and an electronic device that can reduce stress applied to pixels while a fixed image is displayed.

According to an embodiment of the present disclosure, there is provided a display device including: a display panel including a display region configured to display an image and a route region located in the display region; and a drive controller configured to generate image data such that a reference point of the image is shifted along a shift route in the route region, wherein the route region includes a center point, first and second points located on a first diagonal line with respect to the center point, third and fourth points located on a second diagonal line with respect to the center point, a first side between the first and third points, a second side between the third and second points, a third side between the second and fourth points, and a fourth side between the fourth and first points, wherein the shift route includes a plurality of routes, and wherein among the plurality of routes, a first route includes: a first sub-route along which the reference point moves from the center point to the first point; a second sub-route along which the reference point moves from the first point to the third point via first edge points located on the first and second sides; a third sub-route along which the reference point moves from the third point to the second point via second edge points located on the first and second sides; a fourth sub-route along which the reference point moves from the second point to the fourth point via third edge points located on the third and fourth sides; and a fifth sub-route along which the reference point moves from the fourth point to an end point adjacent to the center point via fourth edge points located on the third and fourth sides.

On the first and second sides, the first edge points are different from the second edge points, and on the third and fourth sides, the third edge points are different from the fourth edge points.

The first sub-route is a route along which the reference point moves to first diagonal points located on the first diagonal line.

The second sub-route includes: a second-first sub-route along which the reference point moves from the first point to a first intermediate point in a stepwise manner; a second-second sub-route along which the reference point moves from the first intermediate point to one of first-second edge points on the second side; a second-third sub-route along which the reference point moves from one of the first-second edge points on the second side to one of first-first edge points on the first side; and a second-fourth sub-route along which the reference point moves from one of the first-first edge points on the first side to one of the first-second edge points on the second side.

The third sub-route includes: a third-first sub-route along which the reference point moves from one of second-second edge points on the second side to one of second-first edge points on the first side; and a third-second sub-route along which the reference point moves from one of the second-first edge points on the first side to one of the second-second edge points on the second side, wherein the third-first sub-route has an intersection with the second-third sub-route, and wherein the third-second sub-route has an intersection with one of the second-second sub-route and the second-fourth sub-route.

The second-second sub-route and the second-third sub-route each include a portion parallel to the first diagonal line, and wherein the third-first sub-route and the third-second sub-route are parallel to the first diagonal line.

The third sub-route further includes: a third-third sub-route along which the reference point moves along the second-second edge points on the second side; and a third-fourth sub-route along which the reference point moves along the second-first edge points on the first side, wherein the third-third sub-route is connected to the third-first sub-route or the third-second sub-route, and wherein the third-fourth sub-route is connected to the third-first sub-route or the third-second sub-route.

The fourth sub-route includes: a fourth-first sub-route along which the reference point moves from the second point to a second intermediate point in a stepwise manner; a fourth-second sub-route along which the reference point moves from the second intermediate point to one of third-second edge points on the fourth side; and a fourth-third sub-route along which the reference point moves from one of the third-second edge points on the fourth side to one of third-first edge points on the third side.

The fifth sub-route includes: a fifth-first sub-route along which the reference point moves from one of fourth-second edge points on the fourth side to one of fourth-first edge points on the third side; and a fifth-second sub-route along which the reference point moves from one of the fourth-first edge points on the third side to one of the fourth-second edge points on the fourth side, wherein the fifth-first sub-route has an intersection with the fourth-second sub-route, and wherein the fifth-second sub-route has an intersection with the fourth-third sub-route.

The fourth-second sub-route and the fourth-third sub-route each include a portion parallel to the first diagonal line, and wherein the fifth-first sub-route and the fifth-second sub-route are parallel to the first diagonal line.

The third sub-route further includes: a third-fifth sub-route along which the reference point moves from a third intermediate point to the second point in a stepwise manner.

The fourth sub-route includes: a fourth-first sub-route along which the reference point moves along the third side; a fourth-second sub-route along which the reference point moves from one of third-first edge points on the third side to one of third-second edge points on the fourth side; and a fourth-third sub-route along which the reference point moves from one of the third-second edge points on the fourth side to one of the third-first edge points on the third side.

The fifth sub-route includes: a fifth-first sub-route along which the reference point moves from one of fourth-second edge points on the fourth side to one of fourth-first edge points on the third side; and a fifth-second sub-route along which the reference point moves from one of the fourth-first edge points on the third side to one of the fourth-second edge points on the fourth side, wherein the fifth-first sub-route has an intersection with the fourth-third sub-route, and wherein the fifth-second sub-route has an intersection with the fourth-second sub-route.

The fourth-second sub-route and the fourth-third sub-route each include a portion parallel to the first diagonal line, and wherein the fifth-first sub-route and the fifth-second sub-route are parallel to the first diagonal line.

The first sub-route is a route along which the reference point moves from the center point to the first point in a stepwise manner.

The second sub-route includes: a second-first sub-route along which the reference point moves from the first point to a first intermediate point in a stepwise manner; a second-second sub-route along which the reference point moves from the first intermediate point to the third side; and a second-third sub-route along which the reference point moves from the third side to the fourth side.

The third sub-route includes: a third-first sub-route along which the reference point moves from the fourth side to the third side; and a third-second sub-route along which the reference point moves from the third side to the fourth side, wherein the third-first sub-route has an intersection with a second-fourth sub-route of the second sub-route, and wherein the third-second sub-route has an intersection with the second-fourth sub-route.

The third sub-route further includes: a third-third sub-route along which the reference point moves along the second side; and a third-fourth sub-route along which the reference point moves along the first side, wherein the third-third sub-route is connected to the third-first sub-route or the third-second sub-route, and wherein the third-fourth sub-route is connected to the third-first sub-route or the third-second sub-route.

The fourth sub-route includes: a fourth-first sub-route along which the reference point moves from the second point to a second intermediate point; a fourth-second sub-route along which the reference point moves from the second intermediate point to the second side; and a fourth-third sub-route along which the reference point moves from the second side to the first side.

The fifth sub-route includes: a fifth-first sub-route along which the reference point moves from the first side to the second side; and a fifth-second sub-route along which the reference point moves from the first side to the second side, wherein the fifth-first sub-route has an intersection with the fourth-third sub-route, and wherein the fifth-second sub-route has an intersection with a fourth-fourth sub-route of the fourth sub-route.

The fourth-second sub-route and the fourth-third sub-route each include a portion parallel to the first diagonal line, and wherein the fifth-first sub-route and the fifth-second sub-route are parallel to the first diagonal line.

The center point and the end point are spaced apart from each other by a coordinate region, wherein the display panel includes a plurality of pixels, and wherein the coordinate region is a region corresponding to one of the plurality of pixels.

Among the plurality of routes, a second route includes sixth, seventh, eighth, ninth and tenth sub-routes having shapes obtained by rotating the first, second, third, fourth and fifth sub-routes by a preset angle, respectively and wherein the drive controller alternately shifts the reference point along the first route and the second route.

The display device further includes: an image shift controller configured to provide the shift route to the drive controller, wherein the image shift controller includes a memory in which coordinate information on the first route and coordinate information on the second route are stored.

The route region includes k×k coordinate regions, wherein the center point is a point provided in a central coordinate region located at the center among the k×k coordinate regions, and wherein k is an integer greater than 1.

The first to fourth points are points provided in coordinate regions corresponding to first, second, third and fourth corners of the route region, respectively.

According to an embodiment of the present disclosure, there is provided an electronic device including: a display panel including a display region configured to display an image and a route region located in the display region; a drive controller configured to receive an image signal and generate image data by converting the image signal such that a reference point of the image is shifted along a shift route in the route region; and a processor configured to provide the image signal to the drive controller, wherein the route region includes a center point, first and second points located on a first diagonal line with respect to the center point, third and fourth points located on a second diagonal line with respect to the center point, a first side between the first and third points, a second side between the third and second points, a third side between the second and fourth points, and a fourth side between the fourth and first points, wherein the shift route includes a plurality of routes, and wherein among the plurality of routes, a first route includes: a first sub-route along which the reference point moves from the center point to the first point; a second sub-route along which the reference point moves from the first point to the third point via first edge points located on the first and second sides; a third sub-route along which the reference point moves from the third point to the second point via second edge points located on the first and second sides; a fourth sub-route along which the reference point moves from the second point to the fourth point via third edge points located on the third and fourth sides; and a fifth sub-route along which the reference point moves from the fourth point to an end point adjacent to the center point via fourth edge points located on the third and fourth sides.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Figure 1:
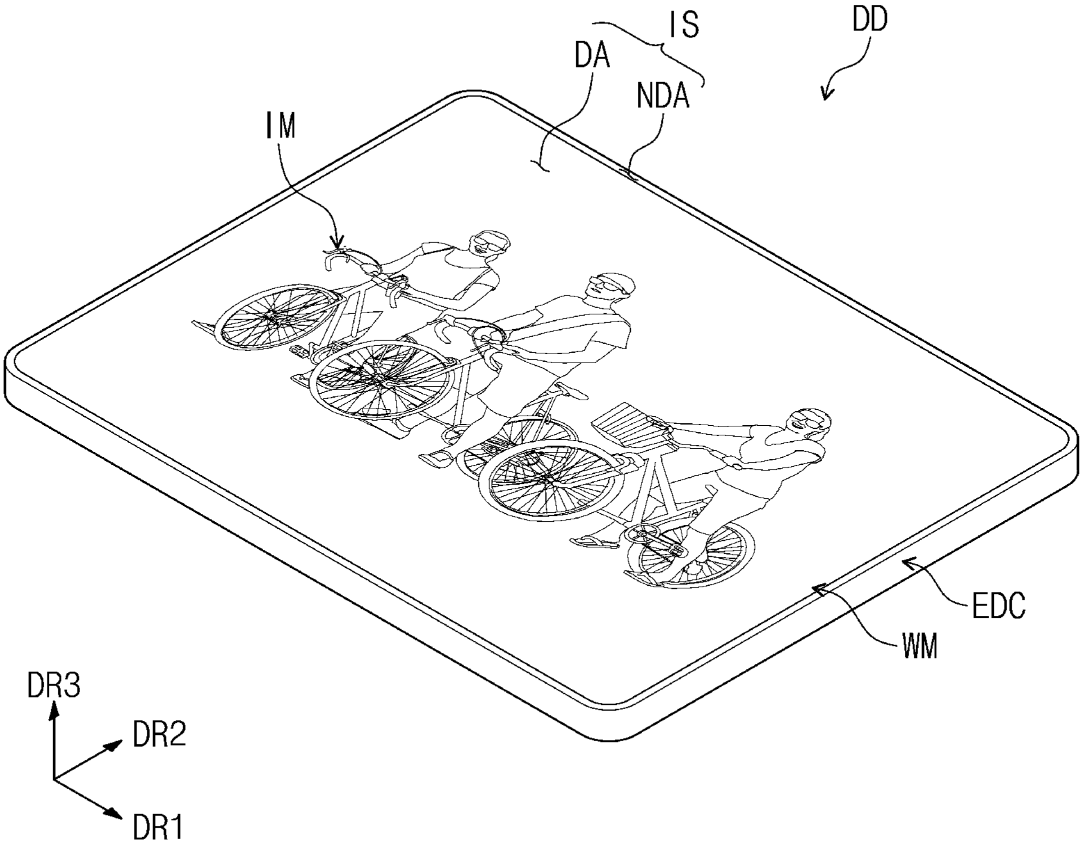
FIG. 1 is a perspective view of a display device according to an embodiment of the present disclosure.

In this specification, when it is mentioned that a component (or, an area, a layer, a part, etc.) is referred to as being "on", "connected to" or "coupled to" another component, this may mean that the component is directly on, connected to, or coupled to the other component or a third component is present therebetween.

Identical reference numerals may refer to identical components through the specification. Additionally, in the drawings, the thicknesses, proportions, and dimensions of components may be exaggerated. As used herein, the term "and/or" includes all of one or more combinations among the related components mentioned.

Terms such as first, second, and the like may be used to describe various components, but the components should not be limited by the terms. The terms may be used to distinguish one component from other components. For example, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawings.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a commonly used dictionary are to be interpreted as having meanings similar to their contextual meanings in the relevant field of art, and are not to be interpreted as having ideal or excessively formal meanings unless clearly described as having such in the present application.

Hereinafter, embodiments of the present disclosure will be described with reference to the accompanying drawings.

Figure 2:
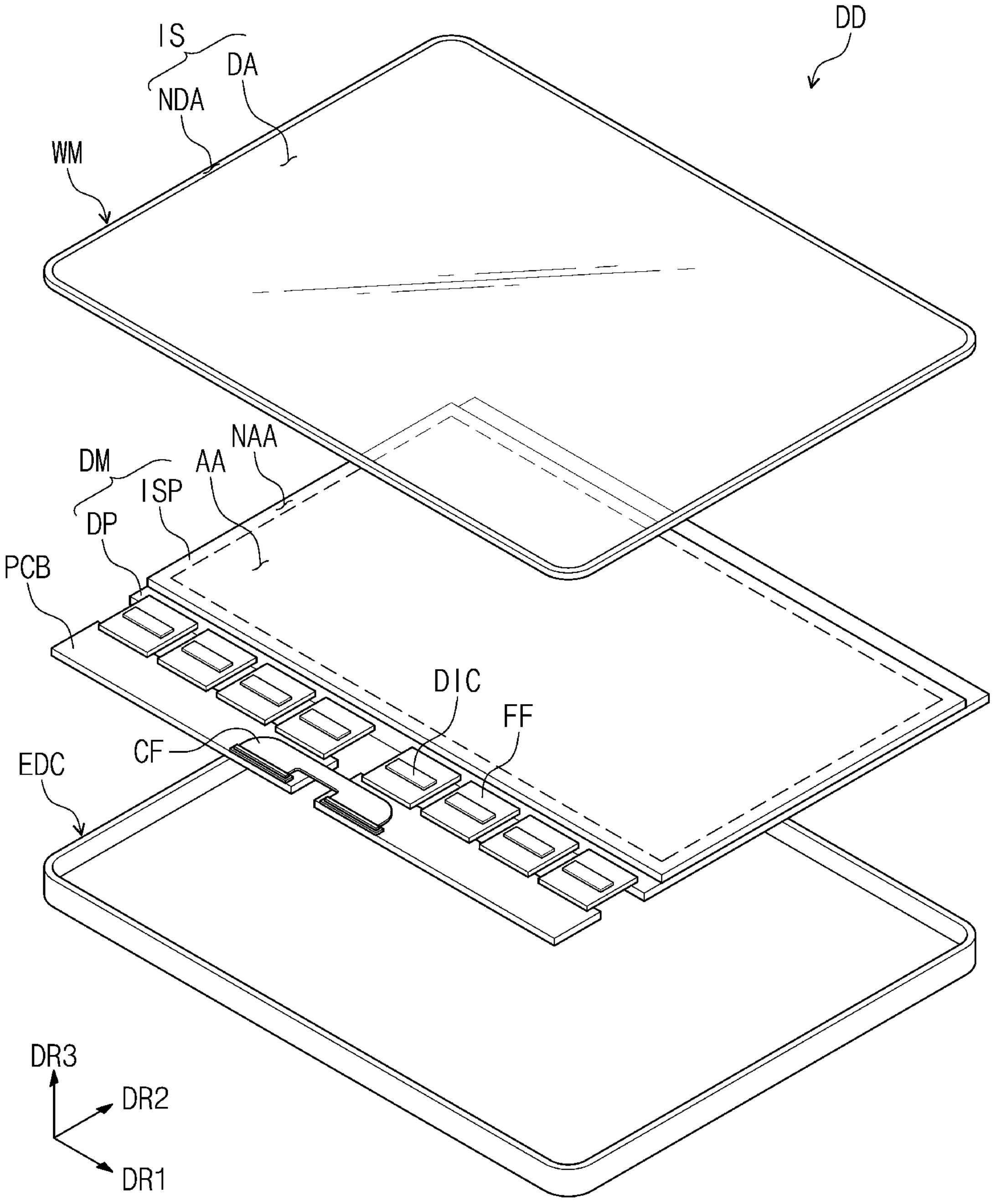
FIG. 2 is an exploded perspective view of the display device according to an embodiment of the present disclosure.

FIG. 1 is a perspective view of a display device according to an embodiment of the present disclosure, and FIG. 2 is an exploded perspective view of the display device according to an embodiment of the present disclosure.

Referring to FIGS. 1 and 2, the display device DD may be a device activated in response to an electrical signal. The display device DD according to the present disclosure may be a large display device such as a television, a monitor, or the like, or may be a small and medium-sized display device such as a mobile phone, a tablet computer, a notebook computer, a car navigation unit, a game machine, or the like. These devices are merely illustrative, and the display device DD may be implemented in other forms without departing from the spirit and scope of the present disclosure. The display device DD has a rectangular shape with long sides in a first direction DR1 and short sides in a second direction DR2 crossing the first direction DR1. However, the shape of the display device DD is not limited thereto, and the display device DD may have various shapes. The display device DD may display an image IM in a third direction DR3 on a display surface IS parallel to the first direction DR1 and the second direction DR2. The display surface IS, on which the image IM is displayed, may correspond to the front surface of the display device DD.

In this embodiment, front surfaces (or, upper surfaces) and rear surfaces (or, lower surfaces) of members are described based on the direction in which the image IM is displayed. The front surfaces and the rear surfaces may be opposite each other in the third direction DR3, and the normal directions of the front surfaces and the rear surfaces may be parallel to the third direction DR3.

The separation distance between the front surface and the rear surface of the display device DD in the third direction DR3 may correspond to the thickness of the display device DD in the third direction DR3. The directions indicated by the first to third directions DR1, DR2, and DR3 may be relative concepts and may be changed to different directions.

The display device DD may sense an external input applied from the outside. The external input may include various forms of inputs provided from outside the display device DD. The display device DD according to an embodiment of the present disclosure may sense a user's external input applied from the outside. The user's external input may be one of various forms of external inputs, such as a part of the user's body, light, heat, the user's gaze, and pressure, or a combination thereof. In addition, the display device DD may sense the user's external input applied to the side surface or the rear surface of the display device DD depending on the structure of the display device DD and is not limited to any one embodiment. In an embodiment of the present disclosure, the external input may include an input by an input device (e.g., a stylus pen, an active pen, a touch pen, an electronic pen, an e-pen, or the like).

The display surface IS of the display device DD may be divided into a display region DA and a non-display region NDA. The display region DA may be a region on which the image IM is displayed. The display region DA may be referred to as a display area. The user visually recognizes the image IM through the display region DA. In this embodiment, the display region DA is illustrated in a rounded rectangular shape. However, this is illustrative, and the display region DA may have various shapes and is not limited to any one embodiment.

The non-display region NDA is adjacent to the display region DA. The image IM may not be displayed on the non-display region NDA. Accordingly, the non-display region NDA may be referred to as a non-display area. The non-display region NDA may have a predetermined color. The non-display region NDA may surround the display region DA. Accordingly, the shape of the display region DA may be substantially defined by the non-display region NDA. However, this is illustrative, and the non-display region NDA may be disposed adjacent to only one side of the display region DA, or may be omitted. The display device DD according to an embodiment of the present disclosure may include various embodiments and is not limited to any one embodiment.

As illustrated in FIG. 2, the display device DD may include a display module DM and a window WM disposed on the display module DM. The display module DM may include a display panel DP and an input sensing layer ISP.

The display panel DP according to an embodiment of the present disclosure may be an emissive display panel. For example, the display panel DP may be an organic light emitting display panel, an inorganic light emitting display panel, or a quantum-dot light emitting display panel. An emissive layer of the organic light emitting display panel may include an organic light emitting material. An emissive layer of the inorganic light emitting display panel may include an inorganic light emitting material. An emissive layer of the quantum-dot light emitting display panel may include quantum dots and quantum rods.

The display panel DP may output the image IM, and the image IM may be displayed through the display surface IS.

The input sensing layer ISP may be disposed on the display panel DP and may sense an external input. The input sensing layer ISP may be directly disposed on the display panel DP. According to an embodiment of the present disclosure, the input sensing layer ISP may be formed on the display panel DP by a continuous process. For example, when the input sensing layer ISP is directly disposed on the display panel DP, an internal adhesive film is not disposed between the input sensing layer ISP and the display panel DP. However, an internal adhesive film may be disposed between the input sensing layer ISP and the display panel DP. In this case, the input sensing layer ISP may not be manufactured together with the display panel DP by a continuous process and may be manufactured separately from the display panel DP and then fixed to the upper surface of the display panel DP by the internal adhesive film.

The window WM may be formed of a transparent material through which the image IM is able to be output. For example, the window WM may be formed of glass, sapphire, plastic, or the like. Although the window WM is illustrated as a single layer, the window WM is not limited thereto and may include a plurality of layers.

The above-described non-display region NDA of the display device DD may be formed by printing a material having a predetermined color on substantially one region of the window WM. In an embodiment of the present disclosure, the window WM may include a window light blocking pattern that defines the non-display region NDA. The window light blocking pattern may be a colored organic film and may be formed by, for example, coating.

The window WM may be coupled to the display module DM through an adhesive film. In an embodiment of the present disclosure, the adhesive film may include an optically clear adhesive (OCA) film. However, without being limited thereto, the adhesive film may include a conventional adhesive or sticky substance. For example, the adhesive film may include an optically clear resin (OCR) or a pressure sensitive adhesive (PSA) film.

An anti-reflective layer may be additionally disposed between the window WM and the display module DM. The anti-reflective layer decreases the reflectance of external light incident from above the window WM. The anti-reflective layer according to an embodiment of the present disclosure may include a phase retarder and a polarizer. The phase retarder may be of a film type or a liquid-crystal coating type and may include a λ/2 phase retarder and/or a λ/4 phase retarder. The polarizer may also be of a film type or a liquid-crystal coating type. The film type may include a stretchable synthetic resin film, and the liquid-crystal coating type may include liquid crystals arranged in a predetermined arrangement. The phase retarder and the polarizer may be implemented with a polarizer film.

In an embodiment of the present disclosure, the anti-reflective layer may include color filters. The arrangement of the color filters may be determined in consideration of the colors of light generated by a plurality of pixels PX (refer to FIG. 3) included in the display panel DP. In this case, the anti-reflective layer may further include a light blocking pattern disposed between the color filters.

The display module DM may display the image IM in response to an electrical signal and may transmit/receive information about an external input. The display module DM may have an effective region AA and an ineffective region NAA. The effective region AA may be a region where the image IM is output from the display panel DP (e.g., a region on which the image IM is displayed). Furthermore, the effective region AA may be a region where the input sensing layer ISP senses an external input applied from the outside. According to an embodiment, the effective region AA of the display module DM may correspond to (or, overlap) at least a portion of the display region DA.

The ineffective region NAA is adjacent to the effective region AA. The ineffective region NAA may be a region on which the image IM is not substantially displayed. For example, the ineffective region NAA may surround the effective region AA. However, this is illustrative, and the ineffective region NAA may be provided in various shapes and is not limited to any one embodiment. According to an embodiment, the effective region AA of the display module DM may correspond to (or, overlap) at least a portion of the non-display region NDA.

The display device DD may further include a plurality of flexible films FF connected to the display panel DP. A driver chip DIC may be mounted on each of the flexible films FF. In an embodiment of the present disclosure, a source drive circuit 200 (refer to FIG. 3) may be constituted by a plurality of driver chips DIC, and the plurality of driver chips DIC may be mounted on the plurality of flexible films FF, respectively.

The display device DD may further include one or more circuit boards PCB coupled to the plurality of flexible films FF. In an embodiment of the present disclosure, two circuit boards PCB may be provided in the display device DD. However, the number of the circuit boards PCB is not limited thereto. Two circuit boards adjacent to each other among the circuit boards PCB may be electrically connected with each other by a connecting film CF. In addition, at least one of the circuit boards PCB may be electrically connected with a main board. A drive controller 100 (refer to FIG. 3) and a voltage generator 400 (refer to FIG. 3) may be disposed on at least one of the circuit boards PCB.

Although FIG. 2 illustrates the structure in which the driver chips DIC are mounted on the flexible films FF, respectively, the present disclosure is not limited thereto. For example, the driver chips DIC may be directly mounted on the display panel DP. In this case, the portions of the display panel DP on which the driver chips DIC are mounted may be bent and may be disposed on the rear surface of the display module DM.

The input sensing layer ISP may be electrically connected with the circuit boards PCB through the flexible films FF. However, embodiments of the present disclosure are not limited thereto. For example, the display module DM may additionally include a separate flexible film for electrically connecting the input sensing layer ISP with the circuit boards PCB.

The display device DD further includes a housing EDC accommodating the display module DM. The housing EDC may be coupled with the window WM to define the exterior of the display device DD. The housing EDC protects components accommodated in the housing EDC, by absorbing an impact applied from the outside and preventing the infiltration of foreign matter/moisture into the display module DM. In an embodiment of the present disclosure, the housing EDC may be provided in a form in which a plurality of receiving members are combined.

The display device DD according to an embodiment may further include an electronic module including various functional modules for operating the display module DM, a power supply module (e.g., a battery) that supplies power required for the overall operation of the display device DD, and a bracket that is coupled with the display module DM and/or the housing EDC and that divides the inner space of the display device DD.

Figure 3:
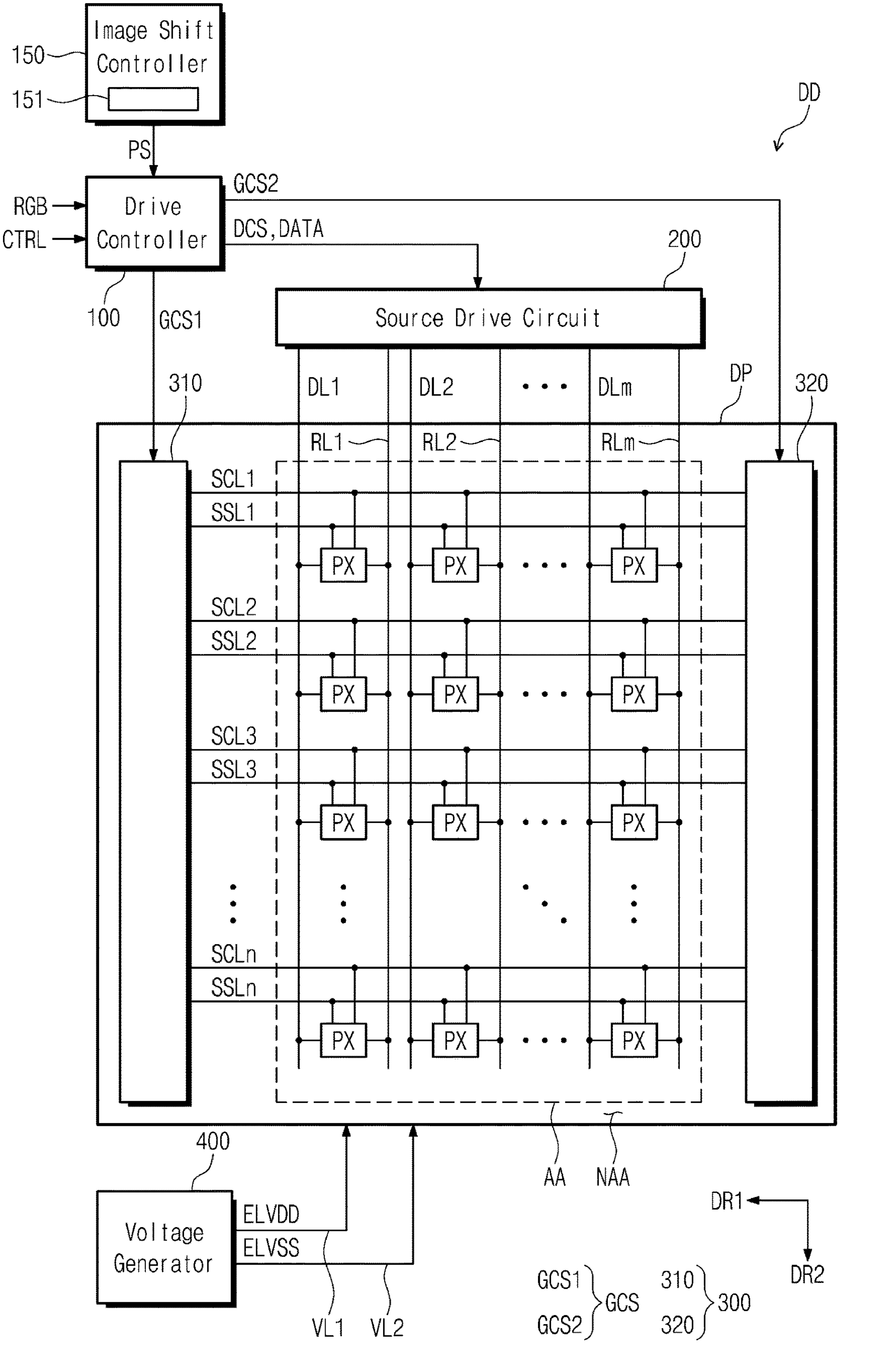
FIG. 3 is a block diagram of the display device according to an embodiment of the present disclosure.

FIG. 3 is a block diagram of the display device according to an embodiment of the present disclosure.

Referring to FIG. 3, the display device DD includes the drive controller 100, an image shift controller 150, the source drive circuit 200, a scan drive circuit 300, the voltage generator 400, and the display panel DP. In an embodiment of the present disclosure, the source drive circuit 200 may include a data driver and a sensing driver.

The display panel DP includes drive scan lines SCL1 to SCLn, sensing scan lines SSL1 to SSLn, data lines DL1 to DLm, a plurality of sensing lines RL1 to RLm, and the pixels PX. The display panel DP may be divided into an effective region AA and an ineffective region NAA. The pixels PX may be disposed in the effective region AA, and the scan drive circuit 300 may be disposed in the ineffective region NAA.

The drive scan lines SCL1 to SCLn and the sensing scan lines SSL1 to SSLn extend parallel to the first direction DR1 and are arranged in the second direction DR2 to be spaced apart from each other. The second direction DR2 may be a direction crossing the first direction DR1. The data lines DL1 to DLm extend parallel to the second direction DR2 from the source drive circuit 200 and are arranged in the first direction DR1 to be spaced apart from each other. The sensing lines RL1 to RLm may extend in the second direction DR2 and may be arranged in the first direction DR1.

The plurality of pixels PX are electrically connected to the drive scan lines SCL1 to SCLn, the sensing scan lines SSL1 to SSLn, the data lines DL1 to DLm, and the sensing lines RL1 to RLm. Each of the plurality of pixels PX may be electrically connected to two scan lines. However, the number of scan lines connected to each pixel PX is not limited thereto. For example, one scan line or three scan lines may be electrically connected to each pixel PX.

Each of the plurality of pixels PX includes a light emitting element ED (refer to FIG. 4A) and a pixel circuit unit PXC (refer to FIG. 4A) that controls light emission of the light emitting element ED. The pixel circuit unit PXC may include a plurality of transistors and a capacitor.

The drive controller 100 receives an input image signal RGB and a control signal CTRL from a main processor (e.g., a microcontroller or a graphic controller). The drive controller 100 may convert the input image signal RGB and may generate image data DATA.

The drive controller 100 generates a scan control signal GCS and a source control signal DCS, based on the control signal CTRL. The source drive circuit 200 receives the source control signal DCS and the image data DATA from the drive controller 100 and converts the image data DATA into data signals in response to the source control signal DCS. The source drive circuit 200 outputs the data signals to the plurality of data lines DL1 to DLm. The data signals may be analog voltages corresponding to gray level values of the image data DATA.

When an image is output (or, displayed) on the display panel DP for a preset period of time (e.g., about 60 seconds) or more, the drive controller 100 may receive a shift route PS from the image shift controller 150. When the drive controller 100 receives the shift route PS, the drive controller 100 may supply, to the source drive circuit 200, the image data DATA to which the shift route PS is applied such that the image is entirely shifted along determined routes. When the source drive circuit 200 receives the image data DATA to which the shift route PS is applied, the image displayed on the display panel DP may be entirely shifted.

The image shift controller 150 may include a memory 151 in which coordinate information for each of the routes is stored and may output the coordinate information for each route as the shift route PS.

The source drive circuit 200 is connected to the plurality of sensing lines RL1 to RLm. The source drive circuit 200 may additionally receive a sensing control signal from the drive controller 100 and may sense characteristics of elements included in each pixel PX of the display panel DP in response to the sensing control signal.

In an embodiment of the present disclosure, the source drive circuit 200 may be in the form of at least one chip. For example, the source drive circuit 200 may be disposed in the driver chips DIC illustrated in FIG. 2.

The scan drive circuit 300 receives the scan control signal GCS from the drive controller 100. The scan drive circuit 300 may output scan signals in response to the scan control signal GCS. The scan drive circuit 300 may be embedded in the display panel DP. When the scan drive circuit 300 is embedded in the display panel DP, the scan drive circuit 300 may include transistors formed through the same process as that of the pixel circuit unit PXC.

The scan drive circuit 300 may generate a plurality of drive scan signals and a plurality of sensing scan signals in response to the scan control signal GCS. The plurality of drive scan signals are applied to the drive scan lines SCL1 to SCLn, and the plurality of sensing scan signals are applied to the sensing scan lines SSL1 to SSLn.

In an embodiment of the present disclosure, the scan drive circuit 300 includes a first scan drive circuit 310 and a second scan drive circuit 320. The first scan drive circuit 310 is disposed on a left side of the effective region AA, and the second scan drive circuit 320 is disposed on a right side of the effective region AA. The first scan drive circuit 310 receives a first scan control signal GCS1 from the drive controller 100, and the second scan drive circuit 320 receives a second scan control signal GCS2 from the drive controller 100. The first scan drive circuit 310 may generate a plurality of drive scan signals and a plurality of sensing scan signals in response to the first scan control signal GCS1. The second scan drive circuit 320 may generate a plurality of drive scan signals and a plurality of sensing scan signals in response to the second scan control signal GCS2.

Although FIG. 3 illustrates the structure in which the first and second scan drive circuits 310 and 320 are disposed on the left and right sides of the effective region AA, the present disclosure is not limited thereto. The scan drive circuit 300 may include only one of the first and second scan drive circuits 310 and 320.

Each of the plurality of pixels PX may receive a first drive voltage ELVDD and a second drive voltage ELVSS.

The voltage generator 400 generates voltages used to operate the display panel DP. In an embodiment of the present disclosure, the voltage generator 400 generates the first drive voltage ELVDD and the second drive voltage ELVSS to operate the display panel DP. The first drive voltage ELVDD and the second drive voltage ELVSS may be provided to the display panel DP through a first drive voltage line VL1 and a second drive voltage line VL2, respectively.

The voltage generator 400 may additionally generate various voltages (e.g., a gamma reference voltage, a data drive voltage, a gate-on voltage, and a gate-off voltage) to operate the source drive circuit 200 and the scan drive circuit 300, in addition to the first drive voltage ELVDD and the second drive voltage ELVSS.

Figure 4A:
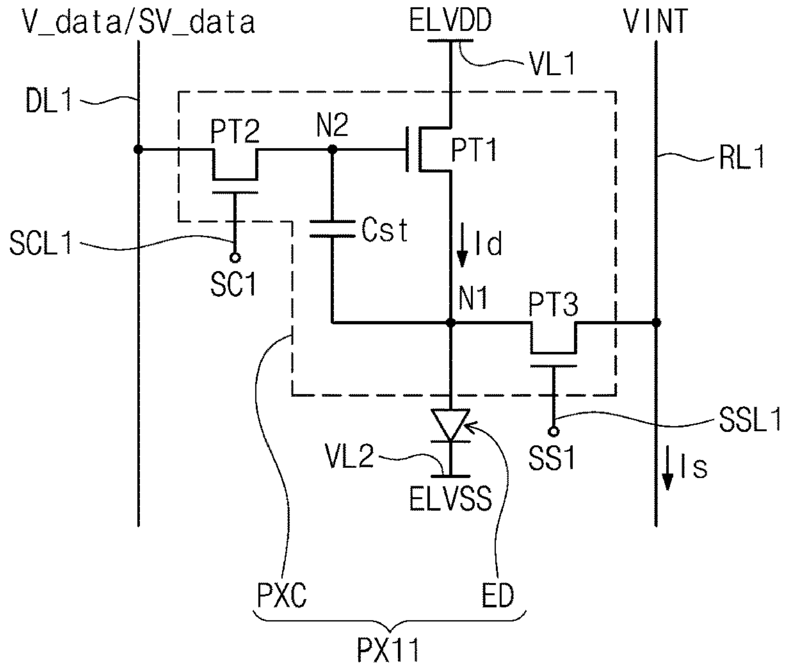
FIG. 4A is a circuit diagram illustrating a pixel according to an embodiment of the present disclosure.
Figure 4B:
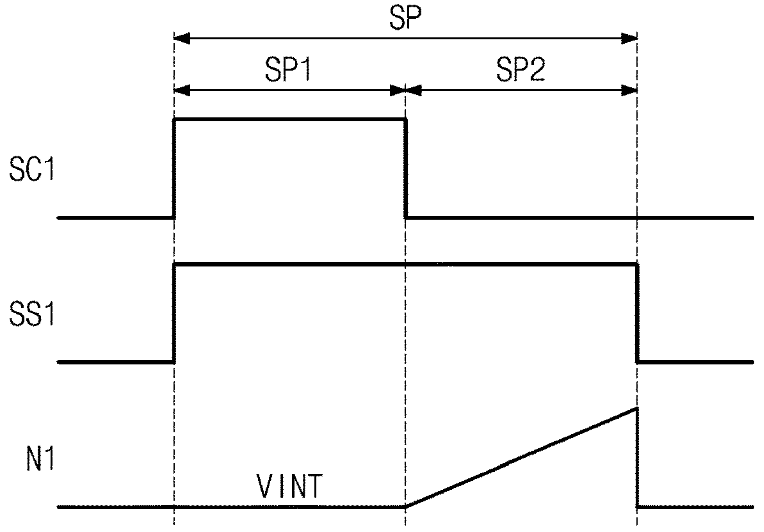
FIG. 4B is a waveform diagram for explaining an operation of the pixel illustrated in FIG. 4A and a sensing period.

FIG. 4A is a circuit diagram illustrating a pixel according to an embodiment of the present disclosure, and FIG. 4B is a waveform diagram for explaining operation of the pixel illustrated in FIG. 4A and a sensing period.

In FIG. 4A, an equivalent circuit diagram of a first pixel PX11 among the plurality of pixels PX illustrated in FIG. 1 is illustrated. As the plurality of pixels PX have the same circuit structure, the description of the circuit structure for the first pixel PX11 may be applied to the other pixels PX of FIG. 1, and thus, detailed descriptions of those pixels will be omitted.

Referring to FIG. 4A, the first pixel PX11 is connected to the first data line DL1, the first drive scan line SCL1, the first sensing scan line SSL1, and the first sensing line RL1.

The first pixel PX11 includes the light emitting element ED and the pixel circuit unit PXC. The light emitting element ED may be a light emitting diode. In an embodiment of the present disclosure, the light emitting element ED may be an organic light emitting diode including an organic light emitting layer. The light emitting element ED may be one of a red light emitting diode that outputs red light, a green light emitting diode that outputs green light, and a blue light emitting diode that outputs blue light.

The pixel circuit unit PXC includes first, second and third transistors PT1, PT2, and PT3 and a capacitor Cst. At least one of the first to third transistors PT1, PT2, and PT3 may be an oxide transistor having an oxide semiconductor layer. Each of the first to third transistors PT1, PT2, and PT3 may be an N-type transistor. However, the present disclosure is not limited thereto. For example, each of the first to third transistors PT1, PT2, and PT3 may be a P-type transistor. Alternatively, a portion of the first to third transistors PT1, PT2, and PT3 may be an N-type transistor, and another portion of the first to third transistors PT1, PT2, and PT3 may be P-type transistors. In addition, at least one of the first to third transistors PT1, PT2, and PT3 may be a transistor having a low-temperature polycrystalline silicon (LTPS) semiconductor layer.

A configuration of the pixel circuit unit PXC according to the present disclosure is not limited to the embodiment illustrated in FIG. 4A. The pixel circuit unit PXC illustrated in FIG. 4A is merely illustrative, and various changes and modifications may be made to the configuration of the pixel circuit unit PXC. For example, the third transistor PT3 may be omitted from the pixel circuit unit PXC.

The first transistor PT1 is connected between the first drive voltage line VL1, which receives the first drive voltage ELVDD, and the light emitting element ED. The first transistor PT1 includes a first electrode connected with the first drive voltage line VL1, a second electrode electrically connected with an anode of the light emitting element ED, and a third electrode connected with a first end of the capacitor Cst. Herein, a contact point at which the anode of the light emitting element ED and the second electrode of the first transistor PT1 are connected may be referred to as a first node N1. The expression "a transistor is connected to a signal line" used herein may mean that one of first to third electrodes of the transistor is integrally formed with the signal line or connected with the signal line through a connecting electrode. Furthermore, the expression "one transistor is electrically connected with another transistor" used herein may mean that one of first to third electrodes of the one transistor is integrally formed with one of first to third electrodes of the other transistor or connected with the one of the first to third electrodes of the other transistor through a connecting electrode.

The first transistor PT1 may receive a data voltage V_data that the first data line DL1 transfers depending on a switching operation of the second transistor PT2 and may supply a drive current to the light emitting element ED.

The second transistor PT2 is connected between the first data line DL1 and the third electrode of the first transistor PT1. The third electrode of the first transistor PT1 may be a gate electrode. The second transistor PT2 includes a first electrode connected with the first data line DL1, a second electrode connected with the third electrode of the first transistor PT1, and a third electrode connected with the first drive scan line SCL1. The third electrode of the second transistor PT2 may be a gate electrode. Herein, a contact point at which the second electrode of the second transistor PT2 and the third electrode of the first transistor PT1 are connected may be referred to as a second node N2. The second transistor PT2 may be turned on depending on a first drive scan signal SC1 transferred through the first drive scan line SCL1. When the second transistor PT2 is turned on it may transfer, to the third electrode of the first transistor PT1, the data voltage V_data transferred from the first data line DL1.

The third transistor PT3 is connected between the second electrode of the first transistor PT1 and the first sensing line RL1. The third transistor PT3 includes a first electrode connected to the first node N1, a second electrode connected with the first sensing line RL1, and a third electrode connected with the first sensing scan line SSL1. The third transistor PT3 may be turned on depending on a first sensing scan signal SS1 transferred through the first sensing scan line SSL1 and may electrically connect the first sensing line RL1 and the first node N1. The third electrode of the third transistor PT3 may be a gate electrode.

The first end of the capacitor Cst is connected to the second node N2, and a second end of the capacitor Cst is connected with the first node N1. A cathode of the light emitting element ED may be connected with the second drive voltage line VL2 that transfers the second drive voltage ELVSS. The second drive voltage ELVSS may have a lower voltage level than the first drive voltage ELVDD.

The light emitting element ED may include the anode connected to the second electrode of the first transistor PT1 (or, the first node N1) and the cathode that receives the second drive voltage ELVSS. The light emitting element ED may generate light corresponding to the amount of current supplied from the first transistor PT1.

Referring to FIGS. 4A and 4B, during a sensing period SP, the first drive scan signal SC1 may be applied to the first drive scan line SCL1, and the first sensing scan signal SS1 may be applied to the first sensing scan line SSL1. The duration of the sensing period SP may be greater than the duration of an activation period of at least one sensing scan signal among the sensing scan signals. For example, the activation period of the first drive scan signal SC1 may be shorter than the duration of the sensing period SP. An activation period of the first drive scan signal SC1 may overlap an activation period of the first sensing scan signal SS1. In an embodiment of the present disclosure, the duration of the activation period of the first sensing scan signal SS1 may be greater than the duration of the activation period of the first drive scan signal SC1 (e.g., two times greater). In an embodiment of the present disclosure, the activation periods may refer to high-level periods.

The sensing period SP may include a write period SP1 during which the first drive scan signal SC1 and the first sensing scan signal SS1 are simultaneously activated and a readout period SP2 during which only the first sensing scan signal SS1 is activated.

During the write period SP1, the second transistor PT2 may be turned on in response to the first drive scan signal SC1, and the third transistor PT3 may be turned on in response to the first sensing scan signal SS1.

A sensing data voltage SV_data may be applied to the second node N2 (e.g., the third electrode of the first transistor PT1) through the first data line DL1 and the turned-on second transistor PT2. The sensing data voltage SV_data, which is applied to the data lines DL1 to DLm during the sensing period SP, may be a voltage set for current sensing. An initialization voltage VINT may be applied to the first node N1 (e.g., the second electrode of the first transistor PT1 or the anode of the light emitting element ED) through the first sensing line RL1 and the turned-on third transistor PT3. The initialization voltage VINT may be a voltage for initializing the first node N1.

A voltage between the first node N1 and the second node N2 may be set to a difference between the sensing data voltage SV_data and the initialization voltage VINT. Charges corresponding to the difference between the sensing data voltage SV_data and the initialization voltage VINT may be stored in the capacitor Cst. The voltage between the first node N1 and the second node N2 may be a voltage between the gate and the source of the first transistor PT1.

Thereafter, when the write period SP1 ends, the first drive scan signal SC1 may be deactivated, and the second transistor PT2 may be turned off. Even though the second transistor PT2 is turned off, the voltage between the first node N1 and the second node N2 may be maintained by the capacitor Cst during the readout period SP2.

Because the voltage between the first node N1 and the second node N2 is greater than the threshold voltage of the first transistor PT1, an electric current (hereinafter, referred to as a drain current Id) may flow through the first transistor PT1 during the readout period SP2. During the readout period SP2, the potential of the first node N1 may be boosted by the drain current Id while the voltage between the first node N1 and the second node N2 is maintained. During the readout period SP2, the drain current Id may be output to the first sensing line RL1 through the turned-on third transistor PT3. The current output to the first sensing line RL1 may be referred to as a sensing current Is.

Figure 5:
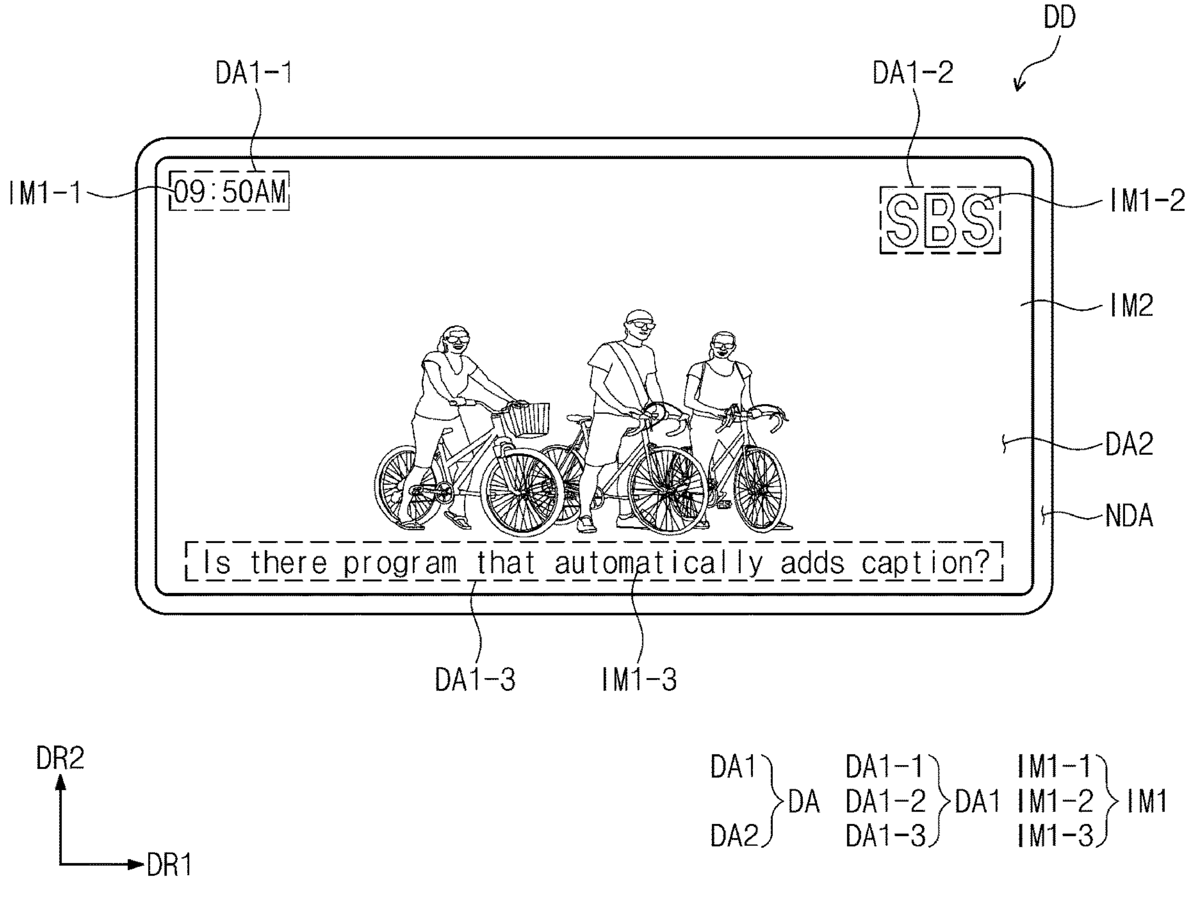
FIG. 5 is a plan view of the display device according to an embodiment of the present disclosure.
Figure 6A:
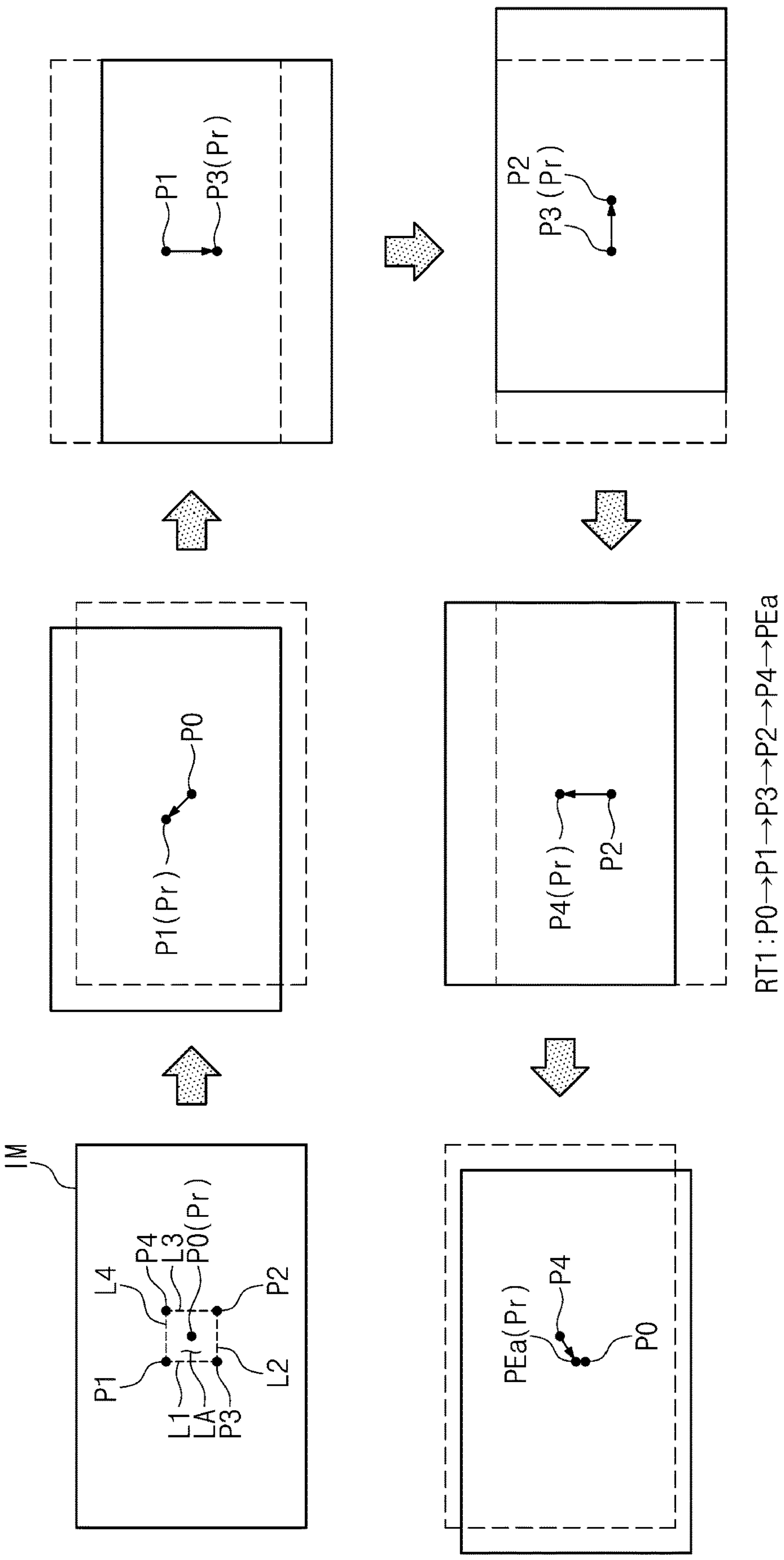
FIGS. 6A and 6B are views illustrating an image shift operation according to an embodiment of the present disclosure.
Figure 6B:
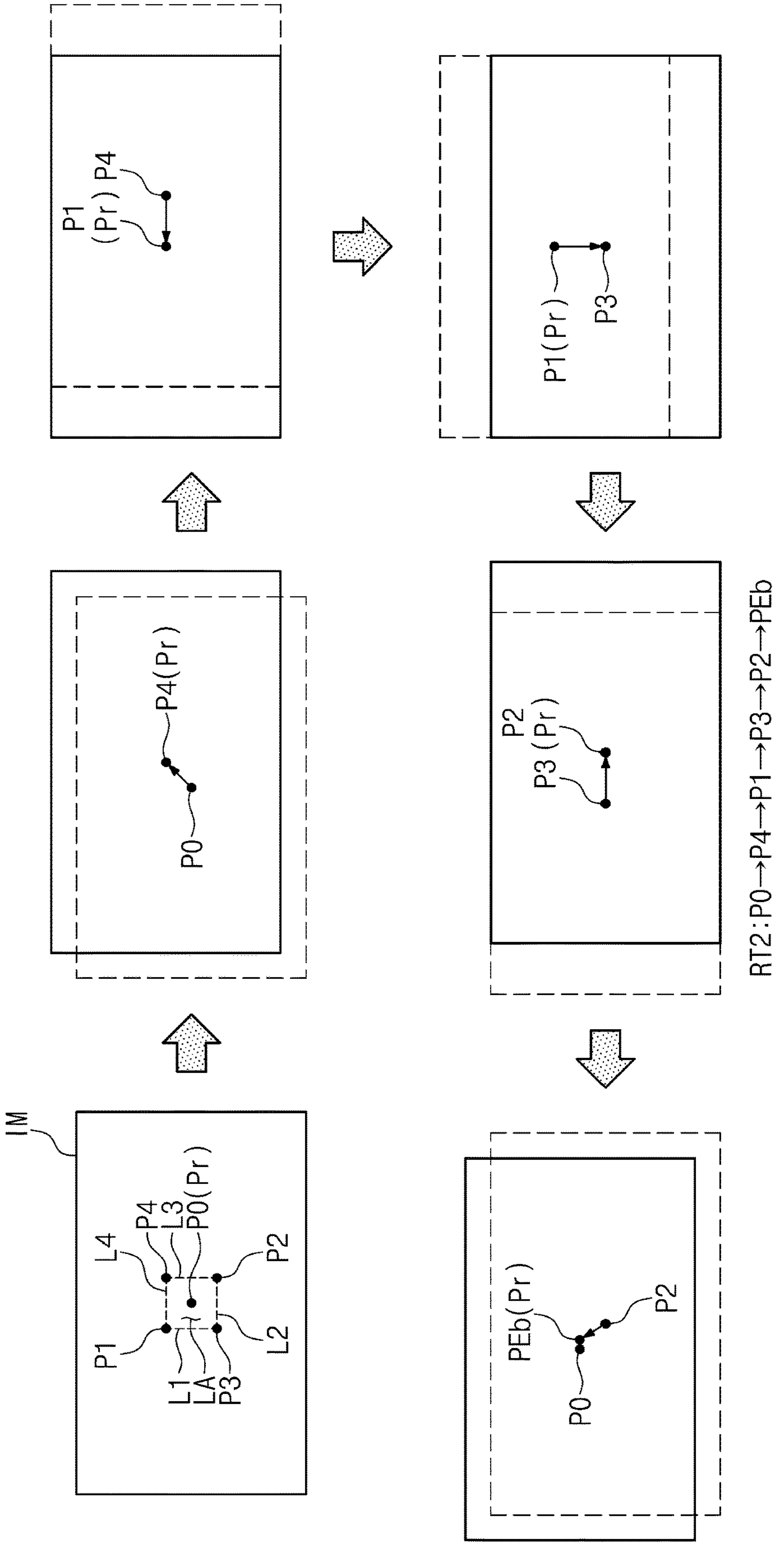

FIG. 5 is a plan view of the display device according to an embodiment of the present disclosure. FIGS. 6A and 6B are views illustrating an image shift operation according to an embodiment of the present disclosure.

Referring to FIG. 5, the display panel DP includes the display region DA that displays the image IM and the non-display region NDA adjacent to the periphery of the display region DA. The display region DA is a region on which an image is substantially displayed, and the non-display region NDA is a bezel region on which an image is not displayed. Although FIG. 5 illustrates the structure in which the non-display region NDA is disposed to surround the display region DA, the present disclosure is not limited thereto. The non-display region NDA may be disposed on only one side of the display region DA.

The image IM may be displayed on the display region DA. The image IM may include a first image IM1 and a second image IM2. The display region DA may be divided into a first display region DA1 on which the first image IM1 is displayed and a second display region DA2 on which the second image IM2 is displayed.

The first image IM1 may be an image displayed at a fixed position for a certain period of time or more with a specific gray level. For example, the first image IM1 may include an image IM1-1 displaying the date or time, a broadcaster logo image IM1-2, a caption image IM1-3, which is an image displaying a program title, and the like. Hereinafter, for convenience of description, images displayed at fixed positions for a preset period of time or more are all referred to as the first image IM1 (or, the fixed images). The second image IM2 may be an image, such as a video, which is rapidly varied without being fixed. The first display region DA1 May include a first fixed display region DA1-1 on which the first fixed image IM1-1 is displayed, a second fixed display region DA1-2 on which the second fixed image IM1-2 is displayed, and a third fixed display region DA1-3 on which the third fixed image IM1-3 is displayed. The first fixed display region DA1-1, the second fixed display region DA1-2 and the third fixed display region DA1-3 may be provided in locations other than those shown in FIG. 5.

When the first image IM1 is displayed for the preset period of time or more in the first display region DA1, pixels located in the first display region DA1 (hereinafter, referred to as the first pixels) may be subjected to a larger stress and more easily degraded than pixels located in the second display region DA2 (hereinafter, referred to as the second pixels). The degradation of the first pixels may be prevented by applying an image shift method such that each of the first pixels does not display the same image for a reference period of time or more. In other words, the degradation of the first pixels can be mitigated by employing an image shift technique. This approach ensures that each of the first pixels does not exhibit the same image for an extended period. In an embodiment of the present disclosure, the image shift method may be applied to the entire display region DA.

Referring to FIGS. 6A and 6B, the image shift method may be a method of setting a reference point Pr in the image IM and shifting the reference point Pr along a plurality of routes in a route region LA.

The route region LA may be a region set with the reference point Pr as a center point P0. In an embodiment of the present disclosure, the route region LA may be a square region formed with the reference point Pr at the center thereof. However, the shape of the route region LA is not particularly limited. When the route region LA is a square region, the route region LA may include four sides (e.g., edges) and four vertices. Here, the four sides may be first, second, third and fourth sides L1, L2, L3, and L4, and points corresponding to the four vertices may be first, second, third and fourth points P1, P2, P3, and P4. The first and second points P1 and P2 may be located on a first diagonal line, and the third and fourth points P3 and P4 may be located on a second diagonal line. The first side L1 connects the first and third points P1 and P3, the second side L2 connects the third and second points P3 and P2, the third side L3 connects the second and fourth points P2 and P4, and the fourth side LA connects the fourth and first points P4 and P1.

The reference point Pr may move from the center point P0 to the first to fourth points P1, P2, P3, and P4. In other words, the reference point Pr is not fixed. Here, FIG. 6A illustrates a process of shifting the image IM using a first route RT1 among the plurality of routes, and FIG. 6B illustrates a process of shifting the image IM using a second route RT2 among the plurality of routes.

Referring to FIG. 6A, the first route RT1 may include first, second, third, fourth and fifth sub-routes. The first sub-route is a route along which the reference point Pr moves from the center point P0 to the first point P1, the second sub-route is a route along which the reference point Pr moves from the first point P1 to the third point P3, and the third sub-route is a route along which the reference point Pr moves from the third point P3 to the second point P2. The fourth sub-route is a route along which the reference point Pr moves from the second point P2 to the fourth point P4, and the fifth sub-route is a route along which the reference point Pr moves from the fourth point P4 to a first end point PEa adjacent to the center point P0. For example, the first route RT1 may be a route along which the reference point Pr moves in the order of the center point P0, the first point P1, the third point P3, the second point P2, the fourth point P4, and the first end point PEa.

Referring to FIG. 6B, the second route RT2 may include sixth, seventh, eighth, ninth and tenth sub-routes. The sixth sub-route is a route along which the reference point Pr moves from the center point P0 to the fourth point P4, the seventh sub-route is a route along which the reference point Pr moves from the fourth point P4 to the first point P1, and the eighth sub-route is a route along which the reference point Pr moves from the first point P1 to the third point P3. The ninth sub-route is a route along which the reference point Pr moves from the third point P3 to the second point P2, and the tenth sub-route is a route along which the reference point Pr moves from the second point P2 to a second end point PEb adjacent to the center point P0. For example, the second route RT2 may be a route along which the reference point Pr moves in the order of the center point P0, the fourth point P4, the first point P1, the third point P3, the second point P2, and the second end point PEb.

Figure 7A:
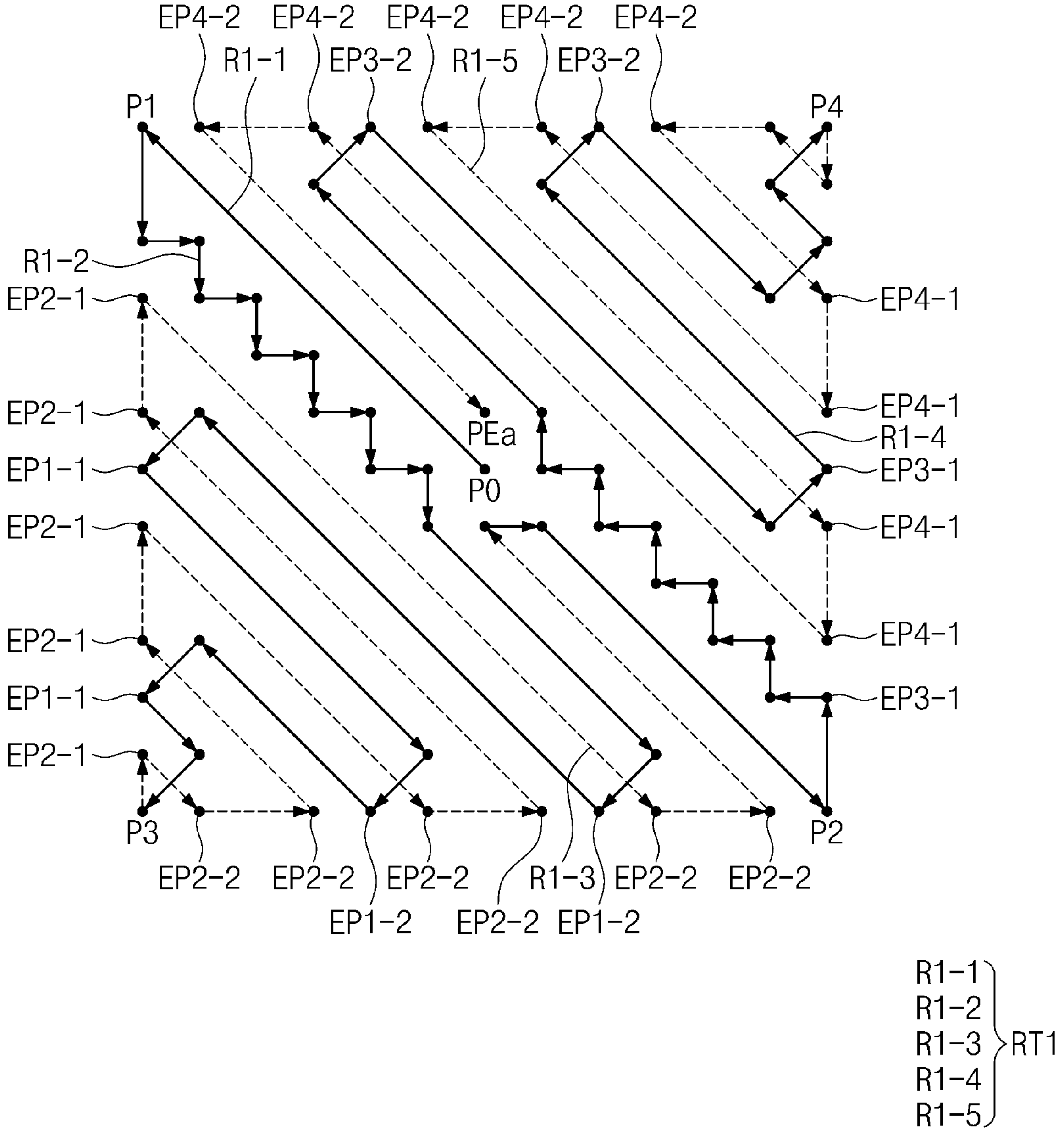
FIGS. 7A and 7B are views for explaining first and second routes according to an embodiment of the present disclosure.
Figure 7B:
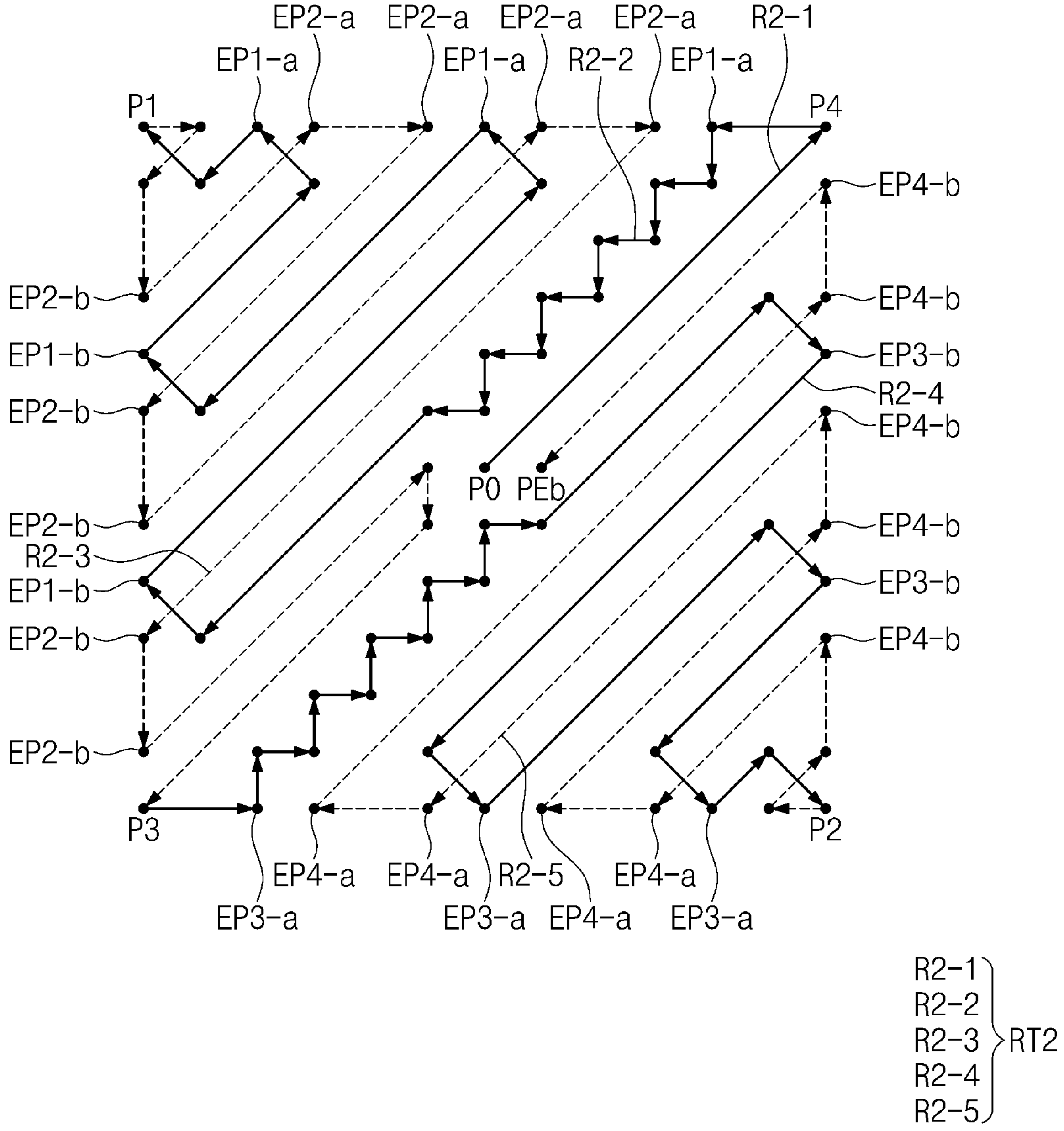

FIGS. 7A and 7B are views for explaining the first and second routes according to an embodiment of the present disclosure.

Referring to FIGS. 6A and 7A, the first route RT1 may include the first, second, third, fourth and fifth sub-routes R1-1, R1-2, R1-3, R1-4, and R1-5. The first sub-route R1-1 is a route along which the reference point Pr moves from the center point P0 to the first point P1. The first sub-route R1-1 may be located on the first diagonal line connecting the first point P1 and the second point P2. The second sub-route R1-2 is a route along which the reference point Pr moves from the first point P1 to the third point P3. Routes passing through first edge points EP1-1 and EP1-2 located on the first and second sides L1 and L2 may be included in the second sub-route R1-2. When the reference point Pr moves along the second sub-route R1-2, the reference point Pr may alternately pass through the first-first edge points EP1-1 located on the first side L1 and first-second edge points EP1-2 located on the second side L2.

The third sub-route R1-3 is a route along which the reference point Pr moves from the third point P3 to the second point P2. In FIG. 7A, most of the third sub-route R1-3 is indicated by dashed lines. Routes passing through second edge points EP2-1 and EP2-2 located on the first and second sides L1 and L2 may be included in the third sub-route R1-3. When the reference point Pr moves along the third sub-route R1-3, the reference point Pr may alternately pass through second-first edge points EP2-1 located on the first side L1 and second-second edge points EP2-2 located on the second side L2. On the first and second sides L1 and L2, the first edge points EP1-1 and EP1-2 may be located at points different from the second edge points EP2-1 and EP2-2. Accordingly, an overlapping point may not occur between the second sub-route R1-2 and the third sub-route R1-3. In other words, overlapping edge points may not occur between the second sub-route R1-2 and the third sub-route R1-3.

The fourth sub-route R1-4 is a route along which the reference point Pr moves from the second point P2 to the fourth point P4. Routes passing through third edge points EP3-1 and EP3-2 located on the third and fourth sides L3 and LA may be included in the fourth sub-route R1-4. When the reference point Pr moves along the fourth sub-route R1-4, the reference point Pr may alternately pass through third-first edge points EP3-1 located on the third side L3 and third-second edge points EP3-2 located on the fourth side LA.

The fifth sub-route R1-5 is a route along which the reference point Pr moves from the fourth point P4 to the first end point PEa adjacent to the center point P0. In FIG. 7A, the fifth sub-route R1-5 is illustrated by dashed lines. Routes passing through fourth edge points EP4-1 and EP4-2 located on the third and fourth sides L3 and L4 may be included in the fifth sub-route R1-5. When the reference point Pr moves along the fifth sub-route R1-5, the reference point Pr may alternately pass through fourth-first edge points EP4-1 located on the third side L3 and fourth-second edge points EP4-2 located on the fourth side L4. On the third and fourth sides L3 and L4, the third edge points EP3-1 and EP3-2 may be located at points different from the fourth edge points EP4-1 and EP4-2. Accordingly, an overlapping point may not occur between the fourth sub-route R1-4 and the fifth sub-route R1-5. In other words, overlapping edge points may not occur between the fourth sub-route R1-4 and the fifth sub-route R1-5.

The first route RT1 may end when the reference point Pr moves from the center point P0 to the first end point PEa.

The second route RT2 may start from the center point P0 after the first route RT1 ends.

Referring to FIGS. 6B and 7B, the second route RT2 may include the sixth, seventh, eighth, ninth and tenth sub-routes R2-1, R2-2, R2-3, R2-4, and R2-5. In an embodiment of the present disclosure, the sixth to tenth sub-routes R2-1, R2-2, R2-3, R2-4, and R2-5 may have shapes obtained by rotating the first to fifth sub-routes R1-1, R1-2, R1-3, R1-4, and R1-5 by a preset angle (e.g., 90° in the clockwise direction).

The sixth sub-route R2-1 is a route along which the reference point Pr moves from the center point P0 to the fourth point P4. The sixth sub-route R2-1 may be located on the second diagonal line connecting the third point P3 and the fourth point P4. The seventh sub-route R2-2 is a route along which the reference point Pr moves from the fourth point P4 to the first point P1. Routes passing through first edge points EP1-*a* and EP1-*b* located on the fourth and first sides L4 and L1 may be included in the seventh sub-route R2-2. When the reference point Pr moves along the seventh sub-route R2-2, the reference point Pr may alternately pass through the first-first edge points EP1-*a* located on the fourth side L4 and the first-second edge points EP1-*b* located on the first side L1.

The eighth sub-route R2-3 is a route along which the reference point Pr moves from the first point P1 to the third point P3. The eighth sub-route R2-3 is illustrated by dashes in FIG. 7B. Routes passing through second edge points EP2-*a* and EP2-*b* located on the fourth and first sides L4 and L1 may be included in the eighth sub-route R2-3. When the reference point Pr moves along the eighth sub-route R2-3, the reference point Pr may alternately pass through second-first edge points EP2-*a* located on the fourth side L4 and second-second edge points EP2-*b* located on the first side L1. On the fourth and first sides L4 and L1, the first edge points EP1-*a* and EP1-*b* may be located at points different from the second edge points EP2-*a* and EP2-*b*. Accordingly, an overlapping point may not occur between the seventh sub-route R2-2 and the eighth sub-route R2-3. In other words, an overlapping edge point may not occur between the seventh sub-route R2-2 and the eighth sub-route R2-3.

The ninth sub-route R2-4 is a route along which the reference point Pr moves from the third point P3 to the second point P2. Routes passing through third edge points EP3-*a* and EP3-*b* located on the second and third sides L2 and L3 may be included in the ninth sub-route R2-4. When the reference point Pr moves along the ninth sub-route R2-4, the reference point Pr may alternately pass through third-first edge points EP3-*a* located on the second side L2 and the third-second edge points EP3-*b* located on the third side L3.

The tenth sub-route R2-5 is a route along which the reference point Pr moves from the second point P2 to the second end point PEb adjacent to the center point P0. The tenth sub-route R2-5 is illustrated by dashes in FIG. 7B. Routes passing through fourth edge points EP4-*a* and EP4-*b* located on the second and third sides L2 and L3 may be included in the tenth sub-route R2-5. When the reference point Pr moves along the tenth sub-route R2-5, the reference point Pr may alternately pass through fourth-first edge points EP4-*a* located on the second side L2 and fourth-second edge points EP4-*b* located on the third side L3. On the second and third sides L2 and L3, the third edge points EP3-*a* and EP3-*b* may be located at points different from the fourth edge points EP4-*a* and EP4-*b*. Accordingly, an overlapping point may not occur between the ninth sub-route R2-4 and the tenth sub-route R2-5. In other words, an overlapping edge point may not occur between the ninth sub-route R2-4 and the tenth sub-route R2-5.

The second route RT2 may end when the reference point Pr moves from the center point P0 to the second end point PEb. The first route RT1 may start again from the center point P0 when the second route RT2 ends.

Although the image shift operation in which the first and second routes RT1 and RT2 among the plurality of routes are alternately repeated has been described with reference to FIGS. 7A and 7B, the present disclosure is not limited thereto. For example, an image shift operation may be executed such that three routes or four routes are repeated.

The first and second routes RT1 and RT2 may enable the reference point Pr to rapidly move to the edge points located on the first to fourth sides L1 to L4 and may prevent the reference point Pr from repeatedly passing through a specific point. Accordingly, stress applied to pixels located in the route region LA may be maximally distributed, and a shift period (e.g., the time from when one route starts to when the one route ends) may be minimized.

Figure 8A:
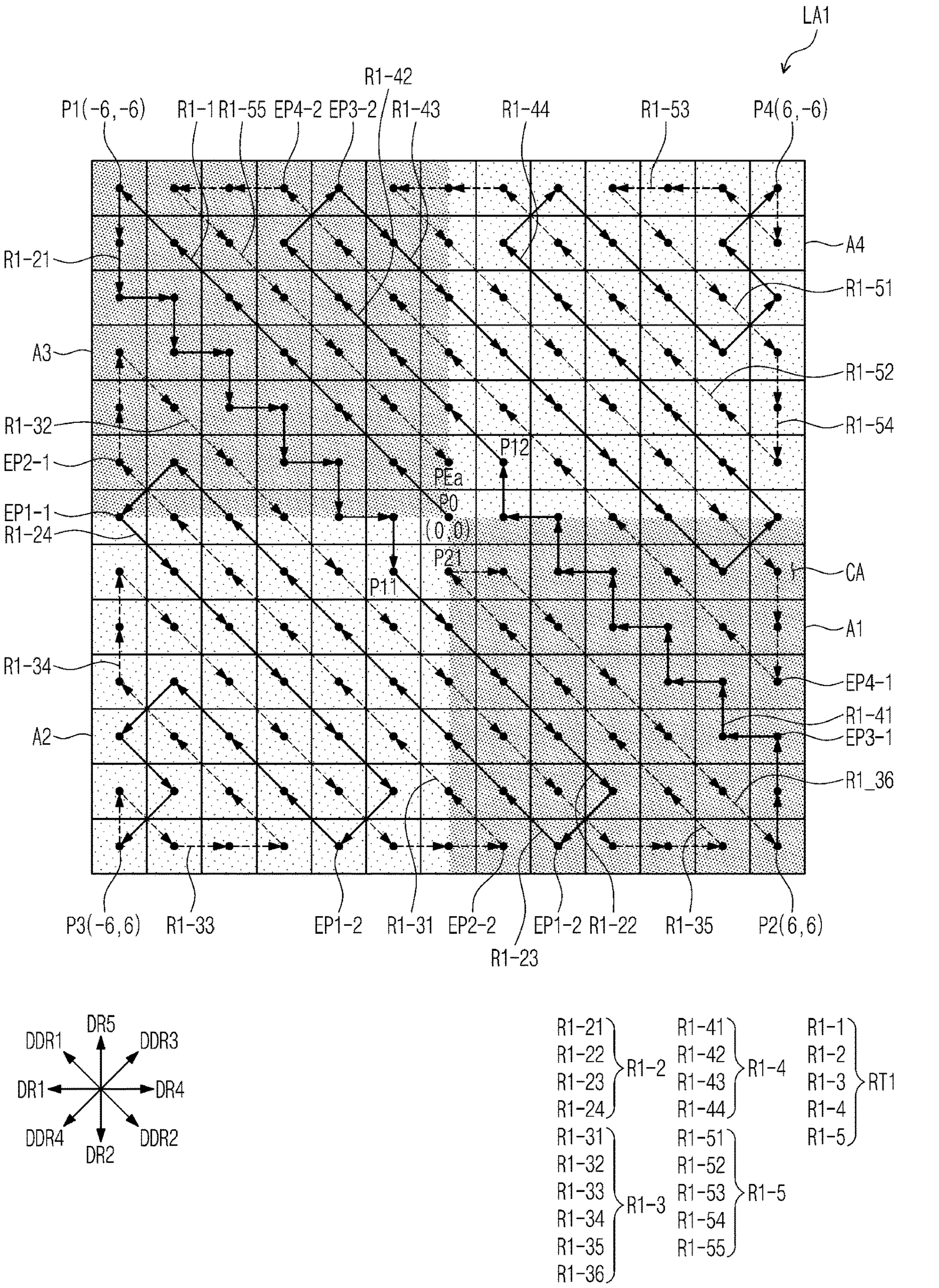
FIGS. 8A and 8B are views illustrating first and second routes applied to a first route region according to an embodiment of the present disclosure.
Figure 8B:
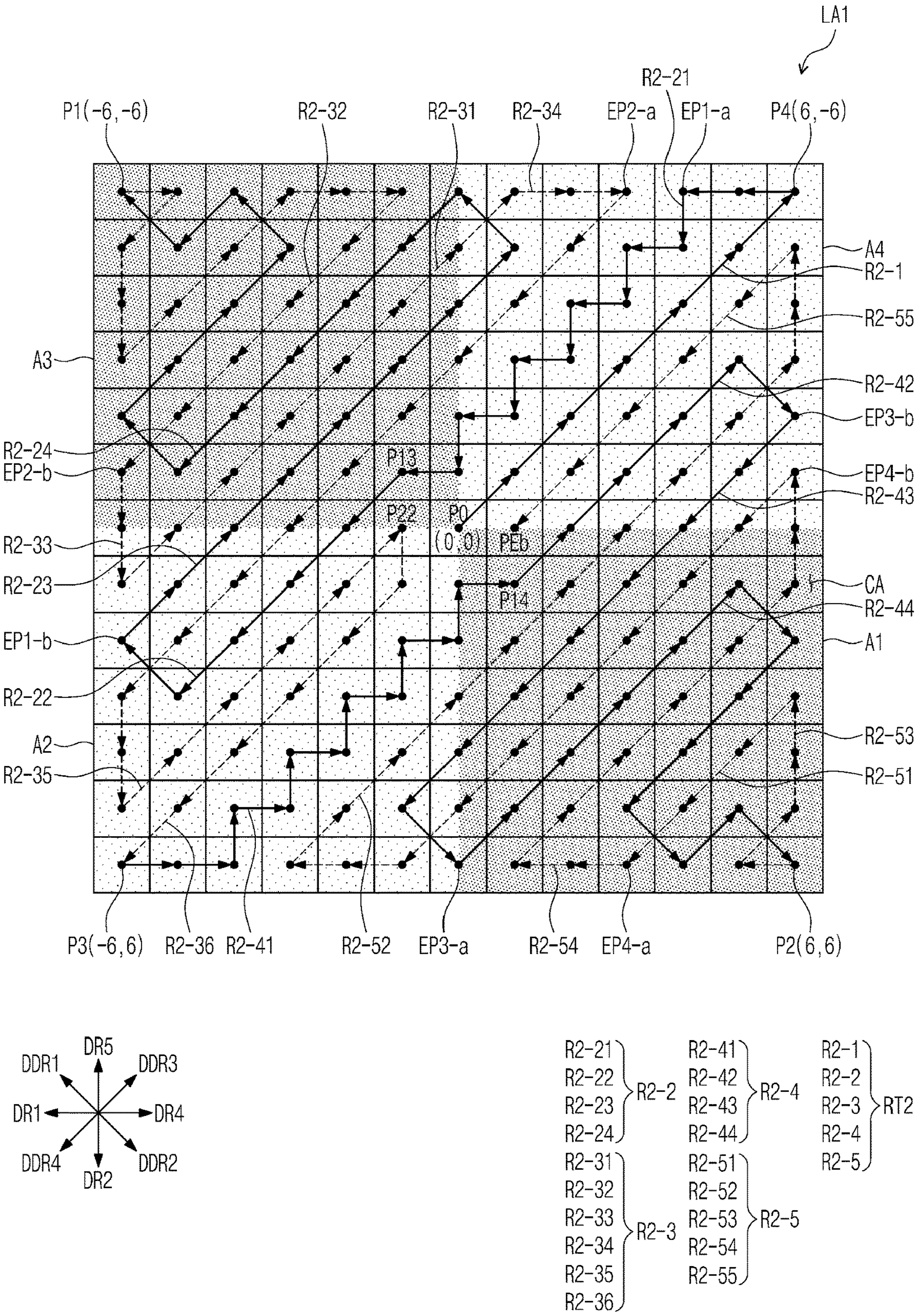

FIGS. 8A and 8B are views illustrating first and second routes applied to a first route region according to an embodiment of the present disclosure.

Referring to FIGS. 8A and 8B, the first route region LA1 may include a plurality of coordinate regions CA corresponding to k×k, and each of the plurality of coordinate regions CA may correspond to a pixel PX (refer to FIG. 3) of the display panel DP (refer to FIG. 3). Here, k may be an integer of 1 or larger. Although FIG. 8A illustrates an example that k is 13, the present disclosure is not limited thereto. A center point P0 is a point provided in a central coordinate region located at the center among the plurality of coordinate regions CA, and first, second, third and fourth points P1, P2, P3 and P4 are points provided in coordinate regions located to correspond to first, second, third and fourth corners of the first route region LA1.

The center point P0 of the first route region LA1 may be a point at which a horizontal center line (hereinafter, referred to as the x axis) and a vertical center line (hereinafter, referred to as the y axis) cross each other. The first route region LA1 may include four regions defined by the x axis and the y axis (e.g., the first, second, third and fourth regions A1, A2, A3 and A4).

Each of the first to fourth regions A1 to A4 may include a plurality of coordinate regions. In an embodiment of the present disclosure, a fourth direction DR4 opposite to the first direction DR1 is a positive x-axis direction, and the first direction DR1 is a negative x-axis direction. In addition, the second direction DR2 is a positive y-axis direction, and a fifth direction DR5 opposite to the second direction DR2 is a negative y-axis direction. Accordingly, the coordinate regions included in the first region A1 may have positive x-axis coordinate values and positive y-axis coordinate values. The coordinate regions included in the second region A2 may have negative x-axis coordinate values and positive y-axis coordinate values. The coordinate regions included in the third region A3 may have negative x-axis coordinate values and negative y-axis coordinate values. The coordinate regions included in the fourth region A4 may have positive x-axis coordinate values and negative y-axis coordinate values.

The first point P1 may be located in the third region A3, the second point P2 may be located in the first region A1, the third point P3 may be located in the second region A2, and the fourth point P4 may be located in the fourth region A4. When the center point P0 has coordinates (0, 0), the first point P1 may have coordinates (−6, −6), and the second point P2 may have coordinates (6, 6). In addition, the third point P3 may have coordinates (−6, 6), and the fourth point P4 may have coordinates (6, −6).

Referring to FIGS. 6A and 8A, the first route RT1 may include first to fifth sub-routes R1-1, R1-2, R1-3, R1-4, and R1-5. On a first diagonal line, a reference point Pr may move from the center point P0 in a first diagonal direction DDR1 by one coordinate region at a time along the first sub-route R1-1. For example, the reference point Pr may sequentially move along first diagonal points located on the first diagonal line. The first diagonal points may be points provided in a plurality of coordinate regions overlapping the first diagonal line.

When the reference point Pr reaches the first point P1 through the first sub-route R1-1, the reference point Pr may move along the second sub-route R1-2. The second sub-route R1-2 may include a second-first sub-route R1-21, a second-second sub-route R1-22, a second-third sub-route R1-23, and a second-fourth sub-route R1-24. The second-first sub-route R1-21 may be a route along which the reference point Pr moves from the first point P1 to a first intermediate point P11 in a stepwise manner. The second-second sub-route R1-22 may be a route along which the reference point Pr moves from the first intermediate point P11 to one of the first-second edge points EP1-2 on the second side L2. In an embodiment of the present disclosure, on the second-second sub-route R1-22, the reference point Pr may move from the first intermediate point P11 in a second diagonal direction DDR2 opposite to the first diagonal direction DDR1 by one coordinate region at a time.

The second-third sub-route R1-23 is a route along which the reference point Pr moves from one of the first-second edge points EP1-2 to one of first-first edge points EP1-1 located on the first side L1. The second-fourth sub-route R1-24 may be a route along which the reference point Pr moves from one of the first-first edge points EP1-1 to one of the first-second edge points EP1-2. The second-third sub-route R1-23 and the second-fourth sub-route R1-24 may be alternately repeated. On the second-third sub-route R1-23, the reference point Pr may move in the first diagonal direction DDR1 by one coordinate region at a time, and on the second-fourth sub-route R1-24, the reference point Pr may move in the second diagonal direction DDR2 by one coordinate region at a time.

When the reference point Pr reaches the third point P3 through the second sub-route R1-2, the reference point Pr may move along the third sub-route R1-3. The third sub-route R1-3 is illustrated by dashed lines. The third sub-route R1-3 may include a third-first sub-route R1-31 and a third-second sub-route R1-32. The third-first sub-route R1-31 is a route along which the reference point Pr moves from one of the second-second edge points EP2-2 on the second side L2 to one of the second-first edge points EP2-1 on the first side L1. The third-second sub-route R1-32 may be a route along which the reference point Pr moves from one of the second-first edge points EP2-1 to one of the second-second edge points EP2-2. On the third-first sub-route R1-31, the reference point Pr may move in the first diagonal direction DDR1 by one coordinate region at a time, and on the third-second sub-route R1-32, the reference point Pr may move in the second diagonal direction DDR2 by one coordinate region at a time.

In an embodiment of the present disclosure, the third-first sub-route R1-31 may have one intersection with the second-third sub-route R1-23. In addition, the third-second sub-route R1-32 may have one intersection with one of the second-second sub-route R1-22 and the second-fourth sub-route R1-24.

The third sub-route R1-3 may further include a third-third sub-route R1-33 and a third-fourth sub-route R1-34. The third-third sub-route R1-33 is a route along which the reference point Pr moves along the second-second edge points EP2-2 on the second side L2, and the third-fourth sub-route R1-34 is a route along which the reference point Pr moves along the second-first edge points EP2-1 on the first side L1. For example, the third-fourth sub-route R1-34 may be adjacent to the first side L1. The third-third sub-route R1-33 is connected to at least one of the third-first sub-route R1-31 and the third-second sub-route R1-32, and the third-fourth sub-route R1-33 is connected to at least one of the third-first sub-route R1-31 and the third-second sub-route R1-32.

The third sub-route R1-3 may further include a third-fifth sub-route R1-35 along which the reference point Pr moves from the third-third sub-route R1-33 to a first transit point P21 and a third-sixth sub-route R1-36 along which the reference point Pr moves from the first transit point P21 to the second point P2. The first transit point P21 may be a point adjacent to the first intermediate point P11 in the fourth direction DR4 opposite to the first direction DR1. The first transit point P21 may also be adjacent to the center point P0.

When the reference point Pr reaches the second point P2 through the third sub-route R1-3, the reference point Pr may move along the fourth sub-route R1-4. The fourth sub-route R1-4 includes a fourth-first sub-route R1-41, a fourth-second sub-route R1-42, a fourth-third sub-route R1-43, and a fourth-fourth sub-route R1-44. The fourth-first sub-route R1-41 is a route along which the reference point Pr moves from the second point P2 to a second intermediate point P12 in a stepwise manner. The fourth-second sub-route R1-42 may be a route along which the reference point Pr moves from the second intermediate point P12 to one of the third-second edge points EP3-2 on the fourth side L4. In an embodiment of the present disclosure, on the fourth-second sub-route R1-42, the reference point Pr may move from the second intermediate point P12 in the first diagonal direction DDR1 by one coordinate region at a time.

The fourth-third sub-route R1-43 is a route along which the reference point Pr moves from one of the third-second edge points EP3-2 to one of the third-first edge points EP3-1 located on the third side L3. The fourth-fourth sub-route R1-44 may be a route along which the reference point Pr moves from one of the third-first edge points EP3-1 to one of the third-second edge points EP3-2. The fourth-third sub-route R1-43 and the fourth-fourth sub-route R1-44 may be alternately repeated. On the fourth-third sub-route R1-43, the reference point Pr may move in the second diagonal direction DDR2 by one coordinate region at a time, and on the fourth-fourth sub-route R1-44, the reference point Pr may move in the first diagonal direction DDR1 by one coordinate region at a time.

When the reference point Pr reaches the fourth point P4 through the fourth sub-route R1-4, the reference point Pr may move along the fifth sub-route R1-5. The fifth sub-route R1-5 may be illustrated by dashed lines. The fifth sub-route R1-5 may include a fifth-first sub-route R1-51 and a fifth-second sub-route R1-52. The fifth-first sub-route R1-51 is a route along which the reference point Pr moves from one of the fourth-second edge points EP4-2 on the fourth side L4 to one of the fourth-first edge points EP4-1 on the third side L3. The fifth-second sub-route R1-52 may be a route along which the reference point Pr moves from one of the fourth-first edge points EP4-1 to one of the fourth-second edge points EP4-2. On the fifth-first sub-route R1-51, the reference point Pr may move in the second diagonal direction DDR2 by one coordinate region at a time, and on the fifth-second sub-route R1-52, the reference point Pr may move in the first diagonal direction DDR1 by one coordinate region at a time.

In an embodiment of the present disclosure, the fifth-first sub-route R1-51 may have one intersection with the fourth-third sub-route R1-43. In addition, the fifth-second sub-route R1-52 may have one intersection with one of the fourth-second sub-route R1-42 and the fourth-fourth sub-route R1-44.

The fifth sub-route R1-5 may further include a fifth-third sub-route R1-53 and a fifth-fourth sub-route R1-54. The fifth-third sub-route R1-53 is a route along which the reference point Pr moves along the fourth-second edge points EP4-2 on the fourth side LA, and the fifth-fourth sub-route R1-54 is a route along which the reference point Pr moves along the fourth-first edge points EP4-1 on the third side L3. For example, a portion of the fifth-third sub-route R1-53 may be adjacent to the fourth side LA, and a portion of the fifth-fourth sub-route R1-54 may be adjacent to the third side L3. The fifth-third sub-route R1-53 is connected to at least one of the fifth-first sub-route R1-51 and the fifth-second sub-route R1-52, and the fifth-fourth sub-route R1-54 is connected to at least one of the fifth-first sub-route R1-51 and the fifth-second sub-route R1-52.

The fifth sub-route R1-5 may further include a fifth-fifth sub-route R1-55 connecting the fifth-third sub-route R1-53 to the first end point PEa. The first end point PEa may be a point adjacent to the center point P0 in the fifth direction DR5 opposite to the second direction DR2. The first end point PEa may be a point shifted from the center point P0 in the fifth direction DR5 by one coordinate region.

When the reference point Pr reaches the first end point PEa through the fifth sub-route R1-5, the first route RT1 may end. The second route RT2 may start from the center point P0 after the first route RT1 ends.

Referring to FIGS. 6B and 8B, the second route RT2 may include sixth to tenth sub-routes R2-1, R2-2, R2-3, R2-4, and R2-5. On a second diagonal line, the reference point Pr may move from the center point P0 in a third diagonal direction DDR3 by one coordinate region at a time along the sixth sub-route R2-1. For example, the reference point Pr may sequentially move along second diagonal points located on the second diagonal line. The second diagonal points may be points provided in a plurality of coordinate regions overlapping the second diagonal line.

When the reference point Pr reaches the fourth point P4 through the sixth sub-route R2-1, the reference point Pr may move along the seventh sub-route R2-2. The seventh sub-route R2-2 may include a seventh-first sub-route R2-21, a seventh-second sub-route R2-22, a seventh-third sub-route R2-23, and a seventh-fourth sub-route R2-24. The seventh-first sub-route R2-21 may be a route along which the reference point Pr moves from the fourth point P4 to a third intermediate point P13 in a stepwise manner. The seventh-second sub-route R2-22 may be a route along which the reference point Pr moves from the third intermediate point P13 to one of the first-second edge points EP1-*b* on the first side L1. In an embodiment of the present disclosure, on the seventh-second sub-route R2-22, the reference point Pr may move from the third intermediate point P13 in a fourth diagonal direction DDR4 opposite to the third diagonal direction DDR3 by one coordinate region at a time.

The seventh-third sub-route R2-23 is a route along which the reference point Pr moves from one of the first-second edge points EP1-*b* to one of the first-first edge points EP1-*a* located on the fourth side L4. The seventh-fourth sub-route R2-24 may be a route along which the reference point Pr moves from one of the first-first edge points EP1-*a* to one of the first-second edge points EP1-*b*. The seventh-third sub-route R2-23 and the seventh-fourth sub-route R2-24 may be alternately repeated. The seventh-third sub-route R2-23 and the seventh-fourth sub-route R2-24 may be parallel to each other. On the seventh-third sub-route R2-23, the reference point Pr may move in the third diagonal direction DDR3 by one coordinate region at a time, and on the seventh-fourth sub-route R2-24, the reference point Pr may move in the fourth diagonal direction DDR4 by one coordinate region at a time.

When the reference point Pr reaches the first point P1 through the seventh sub-route R2-2, the reference point Pr may move along the eighth sub-route R2-3. The eighth sub-route R2-3 may be denoted by dashed lines in FIG. 8B. The eighth sub-route R2-3 may include an eighth-first sub-route R2-31 and an eighth-second sub-route R2-32. The eighth-first sub-route R2-31 and the eighth-second sub-route R2-32 may be parallel to each other. The eighth-first sub-route R2-31 is a route along which the reference point Pr moves from one of the second-second edge points EP2-*b* on the first side L1 to one of the second-first edge points EP2-*a* on the fourth side LA. The eighth-second sub-route R2-32 may be a route along which the reference point Pr moves from one of the second-first edge points EP2-*a* to one of the second-second edge points EP2-*b*. On the eighth-first sub-route R2-31, the reference point Pr may move in the third diagonal direction DDR3 by one coordinate region at a time, and on the eighth-second sub-route R2-32, the reference point Pr may move in the fourth diagonal direction DDR4 by one coordinate region at a time.

In an embodiment of the present disclosure, the eighth-first sub-route R2-31 may have one intersection with the seventh-third sub-route 7-3 R2-23. In addition, the eighth-second sub-route R2-32 may have one intersection with one of the seventh-second sub-route R2-22 and the seventh-fourth sub-route R2-24.

The eighth sub-route R2-3 may further include an eighth-third sub-route R2-33 and an eighth-fourth sub-route R2-34. The eighth-third sub-route R2-33 is a route along which the reference point Pr moves along the second-second edge points EP2-*b* on the first side L1, and the eighth-fourth sub-route R2-34 is a route along which the reference point Pr moves along the second-first edge points EP2-*a* on the fourth side LA. The eighth-third sub-route R2-33 is connected to at least one of the eighth-first sub-route R2-31 and the eighth-second sub-route R2-32, and the eighth-fourth sub-route R2-34 is connected to at least one of the eighth-first sub-route R2-31 and the eighth-second sub-route R2-32.

The eighth sub-route R2-3 may further include an eighth-fifth sub-route R2-35 along which the reference point Pr moves from the eighth-third sub-route R2-33 to a second transit point P22 and an eighth-sixth sub-route R2-36 along which the reference point Pr moves from the second transit point P22 to the third point P3. The second transit point P22 may be a point adjacent to the third intermediate point P13 in the second direction DR2. The second transit point P22 may be adjacent to the center point P0 in the fourth direction DR4.

When the reference point Pr reaches the third point P3 through the eighth sub-route R2-3, the reference point Pr may move along the ninth sub-route R2-4. The ninth sub-route R2-4 includes a ninth-first sub-route R2-41, a ninth-second sub-route R2-42, a ninth-third sub-route R2-43, and a ninth-fourth sub-route R2-44. The ninth-first sub-route R2-41 is a route along which the reference point Pr moves from the third point P3 to a fourth intermediate point P14 in a stepwise manner. The ninth-second sub-route R2-42 may be a route along which the reference point Pr moves from the fourth intermediate point P14 to one of the third-second edge points EP3-*b* on the third side L3. In an embodiment of the present disclosure, on the ninth-second sub-route R2-42, the reference point Pr may move from the fourth intermediate point P14 in the third diagonal direction DDR3 by one coordinate region at a time.

The ninth-third sub-route R2-43 is a route along which the reference point Pr moves from one of the third-second edge points EP3-*b* to one of the third-first edge points EP3-*a* located on the second side L2. The ninth-fourth sub-route R2-44 may be a route along which the reference point Pr moves from one of the third-first edge points EP3-*a* to one of the third-second edge points EP3-*b* on the third side L3. The ninth-third sub-route R2-43 and the ninth-fourth sub-route R2-44 may be alternately repeated. On the ninth-third sub-route R2-43, the reference point Pr may move in the fourth diagonal direction DDR4 by one coordinate region at a time, and on the ninth-fourth sub-route R2-44, the reference point Pr may move in the third diagonal direction DDR3 by one coordinate region at a time.

When the reference point Pr reaches the second point P2 through the ninth sub-route R2-4, the reference point Pr may move along the tenth sub-route R2-5. The tenth sub-route R2-5 may be denoted by dashed lines in FIG. 8B. The tenth sub-route R2-5 may include a tenth-first sub-route R2-51 and a tenth-second sub-route R2-52. The tenth-first sub-route R2-51 is a route along which the reference point Pr moves from one of the fourth-second edge points EP4-*b* on the third side L3 to one of the fourth-first edge points EP4-*a* on the second side L2. The tenth-second sub-route R2-52 may be a route along which the reference point Pr moves from one of the fourth-first edge points EP4-*a* to one of the fourth-second edge points EP4-*b*. On the tenth-first sub-route R2-51, the reference point Pr may move in the fourth diagonal direction DDR4 by one coordinate region at a time, and on the tenth-second sub-route R2-52, the reference point Pr may move in the third diagonal direction DDR3 by one coordinate region at a time.

In an embodiment of the present disclosure, the tenth-first sub-route R2-51 may have one intersection with the ninth-third sub-route R2-43. In addition, the tenth-second sub-route R2-52 may have one intersection with one of the ninth-second sub-route R2-42 and the ninth-fourth sub-route R2-44. For example, the intersection of the tenth-second sub-route R2-52 and the ninth-second sub-route R2-42 may occur near the third side L3.

The tenth sub-route R2-5 may further include a tenth-third sub-route R2-53 and a tenth-fourth sub-route R2-54. The tenth-third sub-route R2-53 is a route along which the reference point Pr moves along the fourth-second edge points EP4-*b* on the third side L3, and the tenth-fourth sub-route R2-54 is a route along which the reference point Pr moves along the fourth-first edge points EP4-*a* on the second side L2. The tenth-third sub-route R2-53 is connected to at least one of the tenth-first sub-routes R2-51 and the tenth-second sub-route R2-52, and the tenth-fourth sub-route R2-54 is connected to at least one of the tenth-first sub-route R2-51 and the tenth-second sub-route R2-52.

The tenth sub-route R2-5 may further include a tenth-fifth sub-route R2-55 connecting the tenth-third sub-route R2-53 to a second end point PEb. The second end point PEb may be a point adjacent to the center point P0 in the fourth direction DR4. The second end point PEb may be a point shifted from the center point P0 in the fourth direction DR4 by one coordinate region.

When the reference point Pr reaches the second end point PEb through the tenth sub-route R2-5, the second route RT2 may end. The first route RT1 may start again from the center point P0 after the second route RT2 ends. In other words, the first and second routes RT1 and RT2 may be alternately repeated.

Because the first and second end points PEa and PEb are located at points shifted from the center point P0 by one coordinate region, the next route may start immediately after a corresponding route ends, and thus, a shift period may be minimized.

Figure 9A:
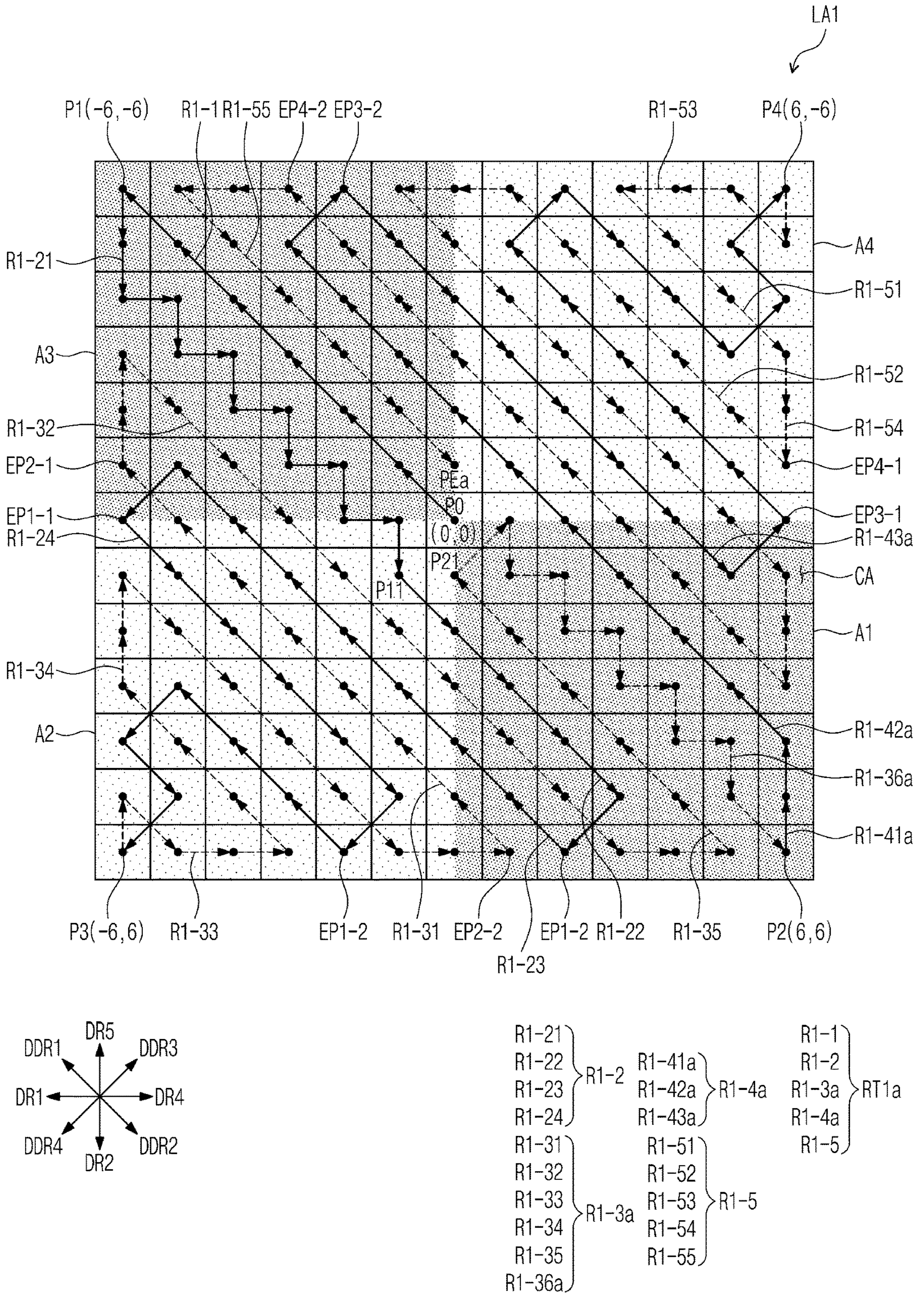
FIGS. 9A and 9B are views illustrating first and second routes applied to a first route region according to an embodiment of the present disclosure.
Figure 9B:
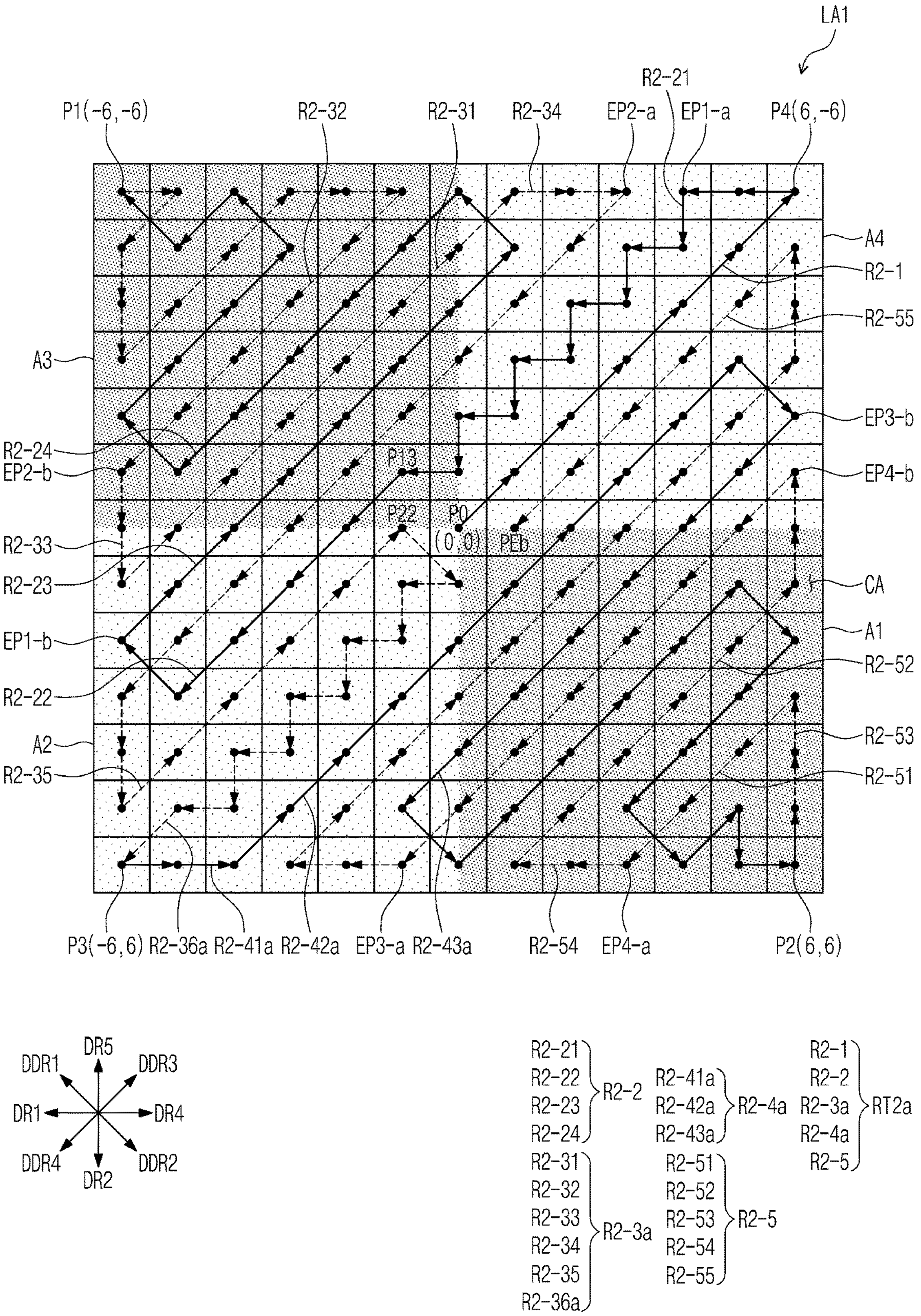

FIGS. 9A and 9B are views illustrating first and second routes applied to a first route region according to an embodiment of the present disclosure. Among components illustrated in FIGS. 9A and 9B, components identical to the components illustrated in FIGS. 8A and 8B will be assigned with identical reference numerals, and detailed descriptions thereabout will be omitted.

Referring to FIGS. 6A and 9A, the first route RT1*a* may include first, second, third, fourth and fifth sub-routes R1-1, R1-2, R1-3*a*, R1-4*a*, and R1-5.

The third sub-route R1-3*a* may include a third-first sub-route R1-31, a third-second sub-route R1-32, a third-third sub-route R1-33, a third-fourth sub-route R1-34, a third-fifth sub-route R1-35, and a third-sixth sub-route R1-36*a*. The third-sixth sub-route R1-36*a* is a route along which the reference point Pr moves from the first transit point P21 to the second point P2. The third-sixth sub-route R1-36*a* may include a portion along which the reference point Pr moves in a stepwise manner.

When the reference point Pr reaches the second point P2 through the third sub-route R1-3*a*, the reference point Pr may move along the fourth sub-route R1-4*a*. The fourth sub-route R1-4*a* may be illustrated as a solid line in FIG. 9A. The fourth sub-route R1-4*a* includes a fourth-first sub-route R1-41*a*, a fourth-second sub-route R1-42*a*, and a fourth-third sub-route R1-43*a*. The fourth-first sub-route R1-41*a* is a route along which the reference point Pr moves from the second point P2 in the fifth direction DR5. The fourth-second sub-route R1-42*a* may be a route along which the reference point Pr moves from one of the third-first edge points EP3-1 on the third side L3 to one of the third-second edge points EP3-2 on the fourth side L4. In an embodiment of the present disclosure, on the fourth-second sub-route R1-42*a*, the reference point Pr may move in the first diagonal direction DDR1 by one coordinate region at a time. The fourth-third sub-route R1-43*a* is a route along which the reference point Pr moves from one of the third-second edge points EP3-2 to one of the third-first edge points EP3-1. On the fourth-third sub-route R1-43*a*, the reference point Pr may move in the second diagonal direction DDR2 by one coordinate region at a time. The fourth-second sub-route R1-42*a* and the fourth-third sub-route R1-43*a* may be alternately repeated. For example, there may be more than one fourth-second sub-route R1-42*a* and one fourth-third sub-route R1-43*a* in the fourth sub-route R1-4*a*.

When the reference point Pr reaches a fourth point P4 through the fourth sub-route R1-4*a*, the reference point Pr may move along the fifth sub-route R1-5. The fifth sub-route R1-5 may include a fifth-first sub-route R1-51 and a fifth-second sub-route R1-52. The fifth-first sub-route R1-51 is a route along which the reference point Pr moves from one of the fourth-second edge points EP4-2 on the fourth side L4 to one of the fourth-first edge points EP4-1 on the third side L3.

The fifth-second sub-route R1-52 may be a route along which the reference point Pr moves from one of the fourth-first edge points EP4-1 to one of the fourth-second edge points EP4-2. On the fifth-first sub-route R1-51, the reference point Pr may move in the second diagonal direction DDR2 by one coordinate region at a time, and on the fifth-second sub-route R1-52, the reference point Pr may move in the first diagonal direction DDR1 by one coordinate region at a time.

In an embodiment of the present disclosure, the fifth-first sub-route R1-51 may have one intersection with the fourth-third sub-route R1-43*a*. In addition, the fifth-second sub-route R1-52 may have one intersection with the fourth-second sub-route R1-42*a*.

When the reference point Pr reaches the first end point PEa through the fifth sub-route R1-5, the first route RT1*a* may end. The second route RT2*a* may start from the center point P0 after the first route RT1*a* ends.

Referring to FIGS. 6B and 9B, the second route RT2*a* may include sixth, seventh, eighth, ninth and tenth sub-routes R2-1, R2-2, R2-3*a*, R2-4*a*, and R2-5.

The eighth sub-route R2-3*a* may include an eighth-first sub-route R2-31, an eighth-second sub-route R2-32, an eighth-third sub-route R2-33, an eighth-fourth sub-route R2-34, an eighth-fifth sub-route R2-35, and an eighth-sixth sub-route R2-36*a*. The eighth-sixth sub-route R2-36*a* is a route along which the reference point Pr moves from a second transit point P22 to the third point P3. The eighth-sixth sub-route R2-36*a* is designated by a dashed line in FIG. 9B. The eighth-sixth sub-route R2-36*a* may include a portion along which the reference point Pr moves in a stepwise manner.

When the reference point Pr reaches the third point P3 through the eighth sub-route R2-3*a*, the reference point Pr may move along the ninth sub-route R2-4*a*. The ninth sub-route R2-4*a* includes a ninth-first sub-route R2-41*a*, a ninth-second sub-route R2-42*a*, and a ninth-third sub-route R2-43*a*. The ninth-first sub-route R2-41*a* is a route along which the reference point Pr moves from the third point P3 in the fourth direction DR4. The ninth-fourth sub-route R2-42*a* may be a route along which the reference point Pr moves from one of the third-first edge points EP3-*a* on the second side L2 to one of the third-second edge points EP3-*b* on the third side L3. In an embodiment of the present disclosure, on the ninth-second sub-route R2-42*a*, the reference point Pr may move in the third diagonal direction DDR3 by one coordinate region at a time. The ninth-third sub-route R2-43*a* is a route along which the reference point Pr moves from one of the third-second edge points EP3-*b* to one of the third-first edge points EP3-*a*. On the ninth-third sub-route R2-43*a*, the reference point Pr may move in the fourth diagonal direction DDR4 by one coordinate region at a time. The ninth-second sub-route R2-42*a* and the ninth-third sub-route R2-43*a* may be alternately repeated.

When the reference point Pr reaches the second point P2 through the ninth sub-route R2-4*a*, the reference point Pr may move along the tenth sub-route R2-5. The tenth sub-route R2-5 may include a tenth-first sub-route R2-51 and a tenth-second sub-route R2-52. The tenth-first sub-route R2-51 is a route along which the reference point Pr moves from one of the fourth-second edge points EP4-*b* on the third side L3 to one of the fourth-first edge points EP4-*a* on the second side L2. The tenth-second sub-route R2-52 may be a route along which the reference point Pr moves from one of the four-first edge points EP4-*a* to one of the fourth-second edge points EP4-*b*. On the tenth-first sub-route R2-51, the reference point Pr may move in the fourth diagonal direction DDR4 by one coordinate region at a time, and on the tenth-second sub-route R2-52, the reference point Pr may move in the third diagonal direction DDR3 by one coordinate region at a time.

In an embodiment of the present disclosure, the tenth-first sub-route R2-51 may have one intersection with the ninth-third sub-route R2-43*a*. In addition, the tenth-second sub-route R2-52 may have one intersection with the ninth-second sub-route R2-42*a*.

When the reference point Pr reaches the second end point PEb through the tenth sub-route R2-5, the second route RT2*a* may end. The first route RT1*a* may start again from the center point P0 after the second route RT2*a* ends.

Figure 10A:
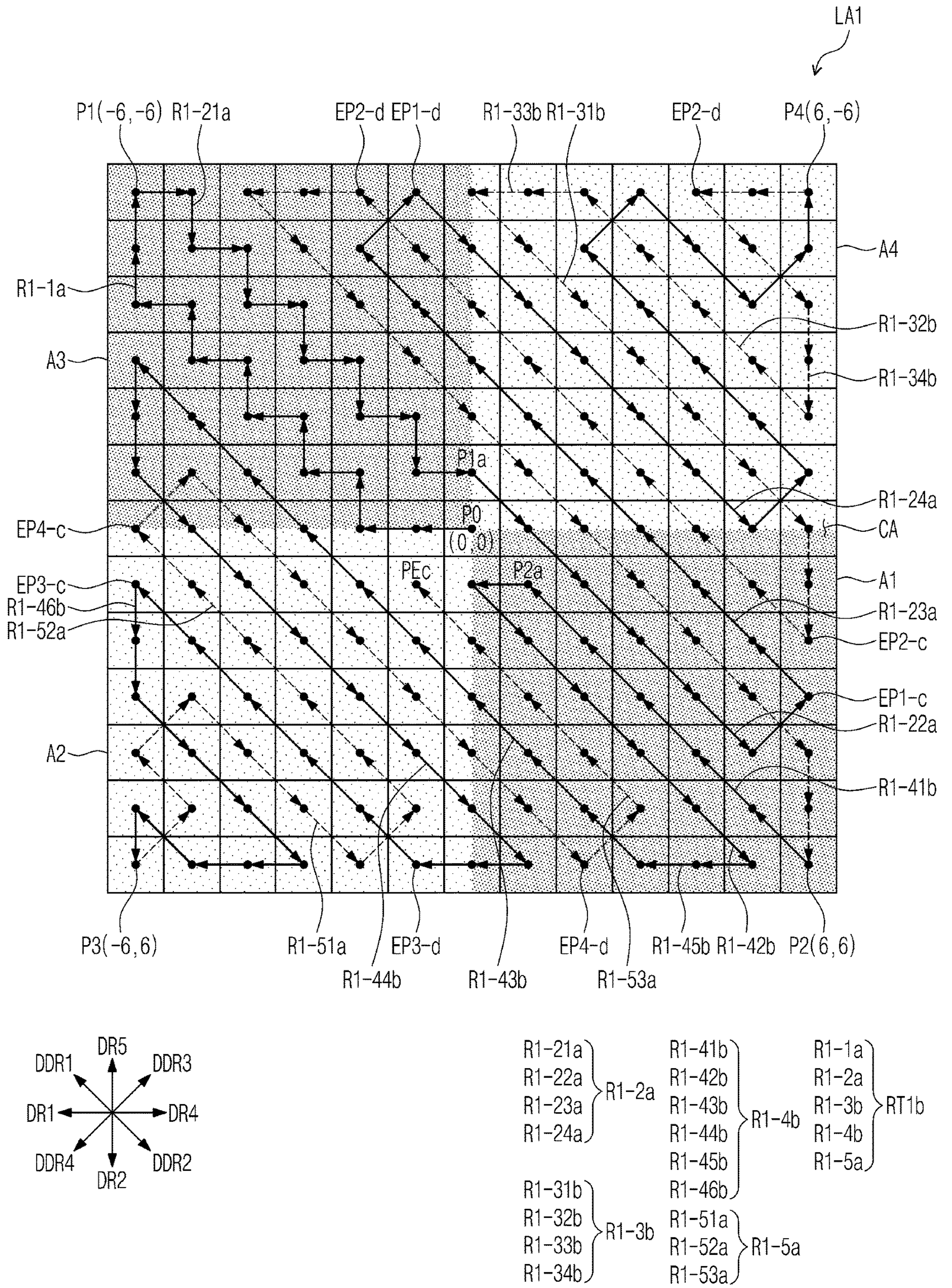
FIGS. 10A and 10B are views illustrating first and second routes applied to a first route region according to an embodiment of the present disclosure.
Figure 10B:
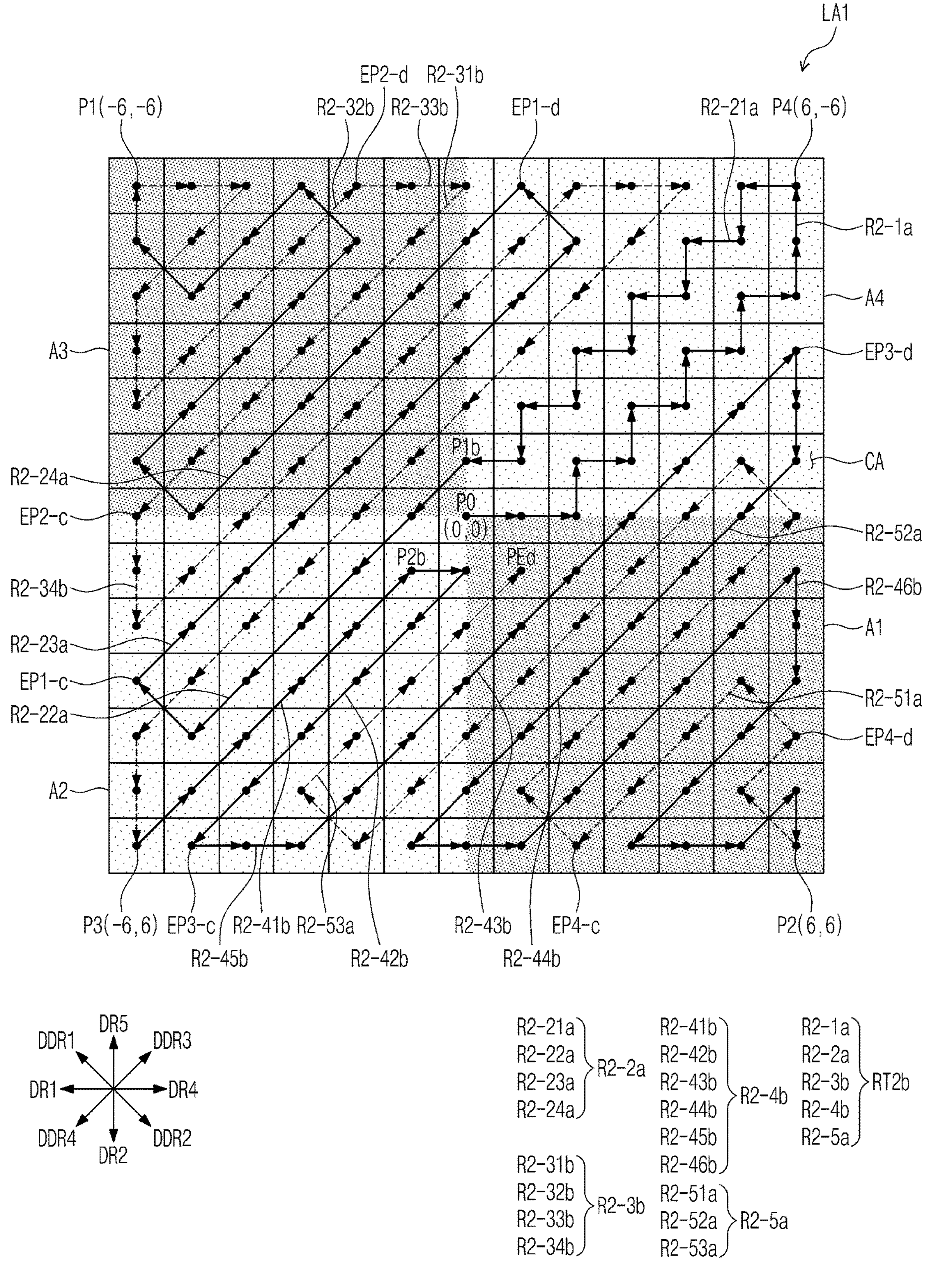

FIGS. 10A and 10B are views illustrating first and second routes applied to a first route region according to an embodiment of the present disclosure. Among components illustrated in FIGS. 10A and 10B, components identical to the components illustrated in FIGS. 8A and 8B will be assigned with identical reference numerals, and detailed descriptions thereabout will be omitted.

Referring to FIG. 10A, the first route RT1*b* may be a route along which a reference point Pr (refer to FIG. 6A) moves in the order of a center point P0, a first point P1, a fourth point P4, a second point P2, a third point P3, and a first end point PEc. The first route RT1*b* may include first, second, third, fourth and fifth sub-routes R1-1*a*, R1-2*a*, R1-3*b*, R1-4*b*, and R1-5*a*.

The first sub-route R1-1*a* may be a route along which the reference point Pr (refer to FIG. 6A) moves from the center point P0 to the first point P1 in a stepwise manner. When the reference point Pr reaches the first point P1 through the first sub-route R1-1*a*, the reference point Pr may move to the fourth point P4 along the second sub-route R1-2*a*.

The second sub-route R1-2*a* may include a second-first sub-route R1-21*a*, a second-second sub-route R1-22*a*, a second-third sub-route R1-23*a*, and a second-fourth sub-route R1-24*a*. The second-first sub-route R1-21*a* may be a route along which the reference point Pr moves from the first point P1 to a first intermediate point P1*a* in a stepwise manner. The second-second sub-route R1-22*a* may be a route along which the reference point Pr moves from the first intermediate point P1*a* to one of first-first edge points EP1-*c* on the third side L3 (refer to FIG. 6A). In an embodiment of the present disclosure, on the second-second sub-route R1-22*a*, the reference point Pr may move from the first intermediate point P1*a* in the second diagonal direction DDR2 opposite to the first diagonal direction DDR1 by one coordinate region at a time.

The second-third sub-route R1-23*a* is a route along which the reference point Pr moves from one of the first-first edge points EP1-*c* to one of first-second edge points EP1-*d* located on a fourth side L4 (refer to FIG. 6A). The second-fourth sub-route R1-24*a* may be a route along which the reference point Pr moves from one of the first-second edge points EP1-*d* to one of the first-first edge points EP1-*c*. The second-third sub-route R1-23*a* and the second-fourth sub-route R1-24*a* may be alternately repeated. The second-third sub-route R1-23*a* and the second-fourth sub-route R1-24*a* may be parallel to each other. On the second-third sub-route R1-23*a*, the reference point Pr may move in the first diagonal direction DDR1 by one coordinate region at a time, and on the second-fourth sub-route R1-24*a*, the reference point Pr may move in the second diagonal direction DDR2 by one coordinate region at a time.

When the reference point Pr reaches the fourth point P4 through the second sub-route R1-2*a*, the reference point Pr may move to the second point P2 along the third sub-route R1-3*b*. The third sub-route R1-3*b* is designated by dashed lines in FIG. 10A. The third sub-route R1-3*b* may include a third-first sub-route R1-31*b* and a third-second sub-route R1-32*b*. The third-first sub-route R1-31*b* is a route along which the reference point Pr moves from one of the second-second edge points EP2-*d* on the fourth side L4 to one of the second-first edge points EP2-*c* on the third side L3. The third-second sub-route R1-32*b* may be a route along which the reference point Pr moves from one of the second-first edge points EP2-*c* to one of the second-second edge points EP2-*d*. On the third-first sub-route R1-31*b*, the reference point Pr may move in the second diagonal direction DDR2 by one coordinate region at a time, and on the third-second sub-route R1-32*b*, the reference point Pr may move in the first diagonal direction DDR1 by one coordinate region at a time.

In an embodiment of the present disclosure, the third-first sub-route R1-31*b* may have one intersection with one of the second-second sub-route R1-22*a* and the second-fourth sub-route R1-24*a*. In addition, the third-second sub-route R1-32*b* may have one intersection with the second-third sub-route R1-23*a*.

The third sub-route R1-3*b* may further include a third-third sub-route R1-33*b* and a third-fourth sub-route R1-34*b*. The third-third sub-route R1-33*b* is a route along which the reference point Pr moves along the second-second edge points EP2-*d* on the fourth side LA, and the third-fourth sub-route R1-34*b* is a route along which the reference point Pr moves along the second-first edge points EP2-*c* on the third side L3. The third-third sub-route R1-33*b* is adjacent to the fourth side LA. The third-third sub-route R1-33*b* is connected to at least one of the third-first sub-route R1-31*b* and the third-second sub-route R1-32*b*, and the third-fourth sub-route R1-34*b* is connected to at least one of the third-first sub-route R1-31*b* and the third-second sub-route R1-32*b*.

When the reference point Pr reaches the second point P2 through the third sub-route R1-3*b*, the reference point Pr may move to the third point P3 along the fourth sub-route R1-4*b*. The fourth sub-route R1-4*b* includes a fourth-first sub-route R1-41*b*, a fourth-second sub-route R1-42*b*, a fourth-third sub-route R1-43*b*, and a fourth-fourth sub-route R1-44*b*. The fourth-first sub-route R1-41*b* is a route along which the reference point Pr moves from the second point P2 to a first transit point P2*a*. In an embodiment of the present disclosure, on the fourth-first sub-route R1-41*b*, the reference point Pr may move in the first diagonal direction DDR1 by one coordinate region at a time. The fourth-second sub-route R1-42*b* may be a route along which the reference point Pr moves from the first transit point P2*a* to one of the third-second edge points EP3-*d* on the second side L2 (refer to FIG. 6A).

The fourth-third sub-route R1-43*b* is a route along which the reference point Pr moves from one of the third-second edge points EP3-*d* to one of the third-first edge points EP3-*c* located on the first side L1 (refer to FIG. 6A). The fourth-fourth sub-route R1-44*b* may be a route along which the reference point Pr moves from one of the third-first edge points EP3-*c* to one of the third-second edge points EP3-*d*. The fourth-third sub-route R1-43*b* and the fourth-fourth sub-route R1-44*b* may be alternately repeated. On the fourth-third sub-route R1-43*b*, the reference point Pr may move in the first diagonal direction DDR1 by one coordinate region at a time, and on the fourth-fourth sub-route R1-44*b*, the reference point Pr may move in the second diagonal direction DDR2 by one coordinate region at a time.

The fourth sub-route R1-4*b* may further include a fourth-fifth sub-route R1-45*b* and a fourth-sixth sub-route R1-46*b*. The fourth-fifth sub-route R1-45*b* is a route along which the reference point Pr moves along the third-second edge points EP3-*d* on the second side L2, and the fourth-sixth sub-route R1-46*b* is a route along which the reference point Pr moves along the third-first edge points EP3-*c* on the first side L1. The fourth-fifth sub-route R1-45*b* is connected to at least one of the fourth-third sub-route R1-43*b* and the fourth-fourth sub-route R1-44*b*, and the fourth-sixth sub-route R1-46*b* is connected to at least one of the fourth-third sub-route R1-43*b* and the fourth-fourth sub-route R1-44*b*.

When the reference point Pr reaches the third point P3 through the fourth sub-route R1-4*b*, the reference point Pr may move to the first end point PEc along the fifth sub-route R1-5*a*. The fifth sub-route R1-5*a* is denoted by dashed lines in FIG. 10A. The fifth sub-route R1-5*a* may include a fifth-first sub-route R1-51*a*, a fifth-second sub-route R1-52*a*, and a fifth-third sub-route R1-53*a*. The fifth-first sub-route R1-51*a* is a route along which the reference point Pr moves from one of the fourth-first edge points EP4-*c* on the first side L1 to one of the fourth-second edge points EP4-*d* on the second side L2. The fifth-second sub-route R1-52*a* may be a route along which the reference point Pr moves from one of the fourth-second edge points EP4-*d* to one of the fourth-first edge points EP4-*c*. On the fifth-first sub-route R1-51*a*, the reference point Pr may move in the second diagonal direction DDR2 by one coordinate region at a time, and on the fifth-second sub-route R1-52*a*, the reference point Pr may move in the first diagonal direction DDR1 by one coordinate region at a time.

The fifth-third sub-route R1-53*a* of the fifth sub-route R1-5*a* connects the fifth-first sub-route R1-51*a* to the first end point PEc. The first end point PEc may be a point adjacent to the center point P0 in the fourth diagonal direction DDR4. The first end point PEc may be a point shifted from the center point P0 in the fourth diagonal direction DDR4 by one coordinate region.

In an embodiment of the present disclosure, the fourth-fourth sub-route R1-44*b* may have one intersection with the fifth-first sub-route R1-51*a*. In addition, the fourth-third sub-route R1-43*b* may have one intersection with one of the fifth-second sub-route R1-52*a* and the fifth-third sub-route R1-53*a*.

When the reference point Pr reaches the first end point PEc through the fifth sub-route R1-5*a*, the first route RT1*b* may end. The second route RT2*b* may start from the center point P0 after the first route RT1*b* ends.

Referring to FIG. 10B, the second route RT2*b* may be a route along which the reference point Pr moves in the order of the center point P0, the fourth point P4, the first point P1, the third point P3, the second point P2, and a second end point PEd. The second route RT2*b* may include sixth, seventh, eighth tenth sub-routes R2-1*a*, R2-2*a*, R2-3*b*, R2-4*b*, and R2-5*a*.

The sixth sub-route R2-1*a* may be a route along which the reference point Pr moves from the center point P0 to the fourth point P4 in a stepwise manner. When the reference point Pr reaches the fourth point P4 through the sixth sub-route R2-1*a*, the reference point Pr may move to the first point P1 along the seventh sub-route R2-2*a*.

The seventh sub-route R2-2*a* may include a seventh-first sub-route R2-21*a*, a seventh-second sub-route R2-22*a*, a seventh-third sub-route R2-23*a*, and a seventh-fourth sub-route R2-24*a*. The seventh-first sub-route R2-21*a* may be a route along which the reference point Pr moves from the fourth point P4 to a second intermediate point P1*b* in a stepwise manner. The seventh-second sub-route R2-22*a* may be a route along which the reference point Pr moves from the second intermediate point P1*b* to one of the second-first edge points EP1-*c* on the first side L1. In an embodiment of the present disclosure, on the seventh-second sub-route R2-22*a*, the reference point Pr may move from the second intermediate point P1*b* in the fourth diagonal direction DDR4 opposite to the third diagonal direction DDR3 by one coordinate region at a time.

The seventh-third sub-route R2-23*a* is a route along which the reference point Pr moves from one of the first-first edge points EP1-*c* to one of the first-second edge points EP1-*d* located on the fourth side LA. The seventh-fourth sub-route R2-24*a* may be a route along which the reference point Pr moves from one of the first-second edge points EP1-*d* to one of the first-first edge points EP1-*c*. The seventh-third sub-route R2-23*a* and the seventh-fourth sub-route R2-24*a* may be alternately repeated. Portions of the seventh-third sub-route R2-23*a* and the seventh-fourth sub-route R2-24*a* may be parallel to each other. On the seventh-third sub-route R2-23*a*, the reference point Pr may move in the third diagonal direction DDR3 by one coordinate region at a time, and on the seventh-fourth sub-route R2-24*a*, the reference point Pr may move in the fourth diagonal direction DDR4 by one coordinate region at a time.

When the reference point Pr reaches the first point P1 through the seventh sub-route R2-2*a*, the reference point Pr may move to the third point P3 along the eighth sub-route R2-3*b*. The eighth sub-route R2-3*b* is denoted by dashed lines in FIG. 10B. The eighth sub-route R2-3*b* may include an eighth-first sub-route R2-31*b* and an eighth-second sub-route R2-32*b*. The eighth-first sub-route R2-31*b* is a route along which the reference point Pr moves from one of the second-second edge points EP2-*d* on the fourth side L4 to one of the second-first edge points 2-1 EP2-*c* on the first side L1. The eighth-second sub-route R2-32*b* may be a route along which the reference point Pr moves from one of the second-first edge points EP2-*c* to one of the second-second edge points EP2-*d*. On the eighth-first sub-route R2-31*b*, the reference point Pr may move in the fourth diagonal direction DDR4 by one coordinate region at a time, and on the eighth-second sub-route R2-32*b*, the reference point Pr may move in the third diagonal direction DDR3 by one coordinate region at a time.

In an embodiment of the present disclosure, the eighth-first sub-route R2-31*b* may have one intersection with one of the seventh-second sub-route R2-22*a* and the seventh-fourth sub-route R2-24*a*. In addition, the eighth-second sub-route R2-32*b* may have one intersection with the seventh-third sub-route R2-23*a*. The eighth sub-route R2-3*b* may further include an eighth-third sub-route R2-33*b* and an eighth-fourth sub-route R2-34*b*.

When the reference point Pr reaches the third point P3 through the eighth sub-route R2-3*b*, the reference point Pr may move to the second point P2 along the ninth sub-route R2-4*b*. The ninth sub-route R2-4*b* includes a ninth-first sub-route R2-41*b*, a ninth-second sub-route R2-42*b*, a ninth-third sub-route R2-43*b*, and a ninth-fourth sub-route R2-44*b*. The ninth-first sub-route R2-41*b* is a route along which the reference point Pr moves from the third point P3 to a second transit point P2*b*. In an embodiment of the present disclosure, on the ninth-first sub-route R2-41*b*, the reference point Pr may move in the third diagonal direction DDR3 by one coordinate region at a time. The ninth-second sub-route R2-42*b* may be a route along which the reference point Pr moves from the second transit point P2*b* to one of the third-first edge points EP3-*c* on the second side L2.

The ninth-third sub-route R2-43*b* is a route along which the reference point Pr moves from one of the third-first edge points EP3-*c* to one of the third-second edge points EP3-*d* located on the third side L3. The ninth-fourth sub-route R2-44*b* may be a route along which the reference point Pr moves from one of the third-second edge points EP3-*d* to one of the third-first edge points EP3-*c*. The ninth-third sub-route R2-43*b* and the ninth-fourth sub-route R2-44*b* may be alternately repeated. On the ninth-third sub-route R2-43*b*, the reference point Pr may move in the third diagonal direction DDR3 by one coordinate region at a time, and on the ninth-fourth sub-route R2-44*b*, the reference point Pr may move in the fourth diagonal direction DDR4 by one coordinate region at a time.

The ninth sub-route R2-4*b* may further include a ninth-fifth sub-route R2-45*b* and a ninth-sixth sub-route R2-46*b*. The ninth-fifth sub-route R2-45*b* is a route along which the reference point Pr moves along the third-first edge points EP3-*c* on the second side L2, and the ninth-sixth sub-route R2-46*b* is a route along which the reference point Pr moves along the third-second edge points EP3-*d* on the third side L3. The ninth-fifth sub-route R2-45*b* is disposed adjacent to the third side L3. The ninth-fifth sub-route R2-45*b* is connected to at least one of the ninth-third sub-route R2-43*b* and ninth-fourth sub-route R2-44*b*, and the ninth-sixth sub-route R2-46*b* is connected to at least one of the ninth-third sub-route R2-43*b* and the ninth-fourth sub-route R2-44*b*.

When the reference point Pr reaches the second point P2 through the ninth sub-route R2-4*b*, the reference point Pr may move to the second end point PEd along the tenth sub-route R2-5*a*. The tenth sub-route R2-5*a* may include a tenth-first sub-route R2-51*a*, a tenth-second sub-route R2-52*a*, and a tenth-third sub-route R2-53*a*. The tenth-first sub-route R2-51*a* is a route along which the reference point Pr moves from one of the fourth-second edge points EP4-*d* on the third side L3 to one of the fourth-first edge points EP4-*c* on the second side L2. The tenth-second sub-route R2-52*a* may be a route along which the reference point Pr moves from one of the fourth-first edge points EP4-*c* to one of the fourth-second edge points EP4-*d*. On the tenth-first sub-route R2-51*a*, the reference point Pr may move in the fourth diagonal direction DDR4 by one coordinate region at a time, and on the tenth-second sub-route R2-52*a*, the reference point Pr may move in the third diagonal direction DDR3 by one coordinate region at a time.

The tenth-third sub-route R2-53*a* of the tenth sub-route R2-5*a* may connect the tenth-first sub-route R2-51*a* to the second end point PEd. The second end point PEd may be a point adjacent to the center point P0 in the second diagonal direction DDR2. The second end point PEd may be a point shifted from the center point P0 in the second diagonal direction DDR2 by one coordinate region.

In an embodiment of the present disclosure, the ninth-fourth sub-route R2-44*b* may have one intersection with the tenth-first sub-route R2-51*a*. In addition, the ninth-third sub-route R2-43*b* may have one intersection with one of the tenth-second sub-route R2-52*a* and the tenth-third sub-route R2-53*a*.

When the reference point Pr reaches the second end point PEd through the tenth sub-route R2-5*a*, the second route RT2*b* may end. The first route RT1*b* may start again from the center point P0 after the second route RT2*b* ends.

Figure 11A:
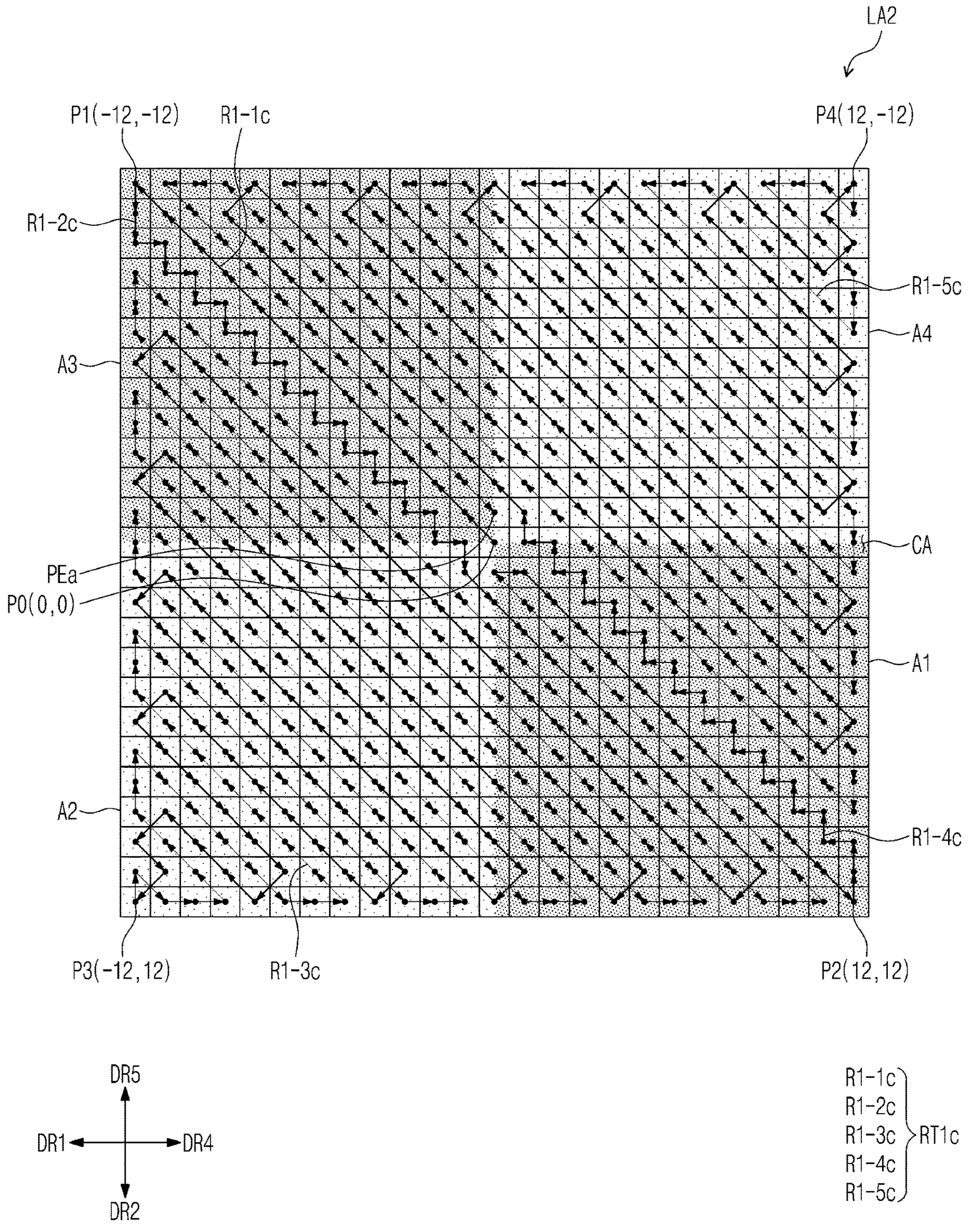
FIGS. 11A and 11B are views illustrating first and second routes applied to a second route region according to an embodiment of the present disclosure.
Figure 11B:
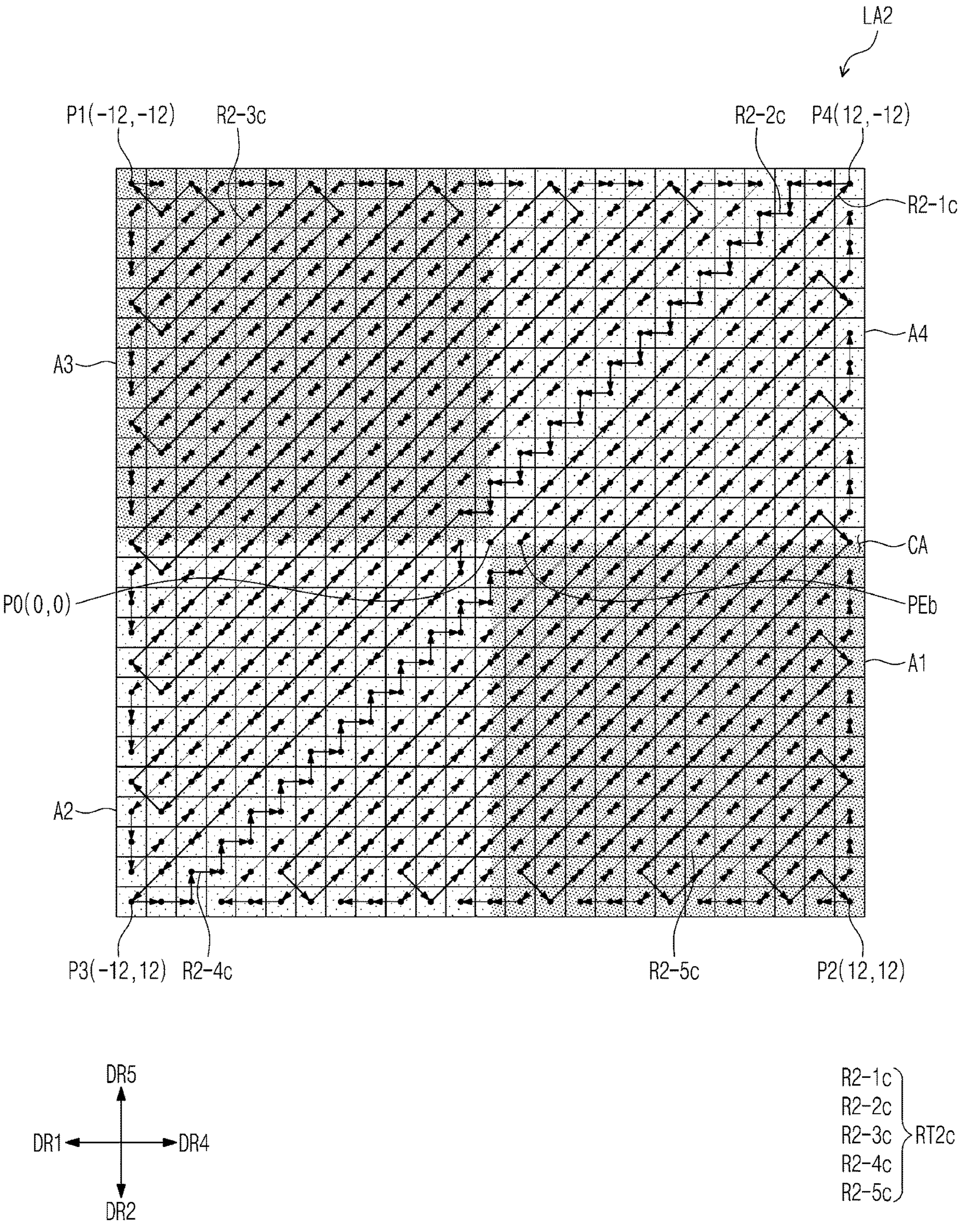

FIGS. 11A and 11B are views illustrating first and second routes applied to a second route region according to an embodiment of the present disclosure.

Referring to FIGS. 11A and 11B, the second route region LA2 may include a plurality of coordinate regions CA corresponding to k×k. Here, k may be an integer of 1 or larger. Although FIG. 11A illustrates an example that k is 25, the present disclosure is not limited thereto. A center point P0 is a point provided in a coordinate region located at the center among the plurality of coordinate regions CA, and first, second, third and fourth points P1, P2, P3 and P4 are points provided in coordinate regions located to correspond to first to fourth corners of the second route region LA2.

The second route region LA2 may include four regions defined by the x axis and the y axis (e.g., the first to fourth regions A1 to A4). Each of the first to fourth regions A1 to A4 may include a plurality of coordinate regions. In an embodiment of the present disclosure, the fourth direction DR4 opposite to the first direction DR1 is the positive x-axis direction, and the first direction DR1 is the negative x-axis direction. In addition, the second direction DR2 is the positive y-axis direction, and the fifth direction DR5 opposite to the second direction DR2 is the negative y-axis direction. Accordingly, the coordinate regions included in the first region A1 may have positive x-axis coordinate values and positive y-axis coordinate values. The coordinate regions included in the second region A2 may have negative x-axis coordinate values and positive y-axis coordinate values. The coordinate regions included in the third region A3 may have negative x-axis coordinate values and negative y-axis coordinate values. The coordinate regions included in the fourth region A4 may have positive x-axis coordinate values and negative y-axis coordinate values.

The first point P1 may be located in the third region A3, the second point P2 may be located in the first region A1, the third point P3 may be located in the second region A2, and the fourth point P4 may be located in the fourth region A4. When the center point P0 has coordinates (0, 0), the first point P1 may have coordinates (−12, −12), and the second point P2 may have coordinates (12, 12). In addition, the third point P3 may have coordinates (−12, 12), and the fourth point P4 may have coordinates (12, −12).

As illustrated in FIG. 11A, a reference point Pr moves from the center point P0 to a first end point PEa along a first route RT1*c*. The first route RT1*c* may include first, second, third, fourth and fifth sub-routes R1-1*c*, R1-2*c*, R1-3*c*, R1-4*c*, and R1-5*c*. The shapes of the first to fifth sub-routes R1-1*c*, R1-2*c*, R1-3*c*, R1-4*c*, and R1-5*c* may be similar to the shapes of the first to fifth sub-routes R1-1, R1-2, R1-3, R1-4, and R1-5 illustrated in FIG. 8A.

As illustrated in FIG. 11B, the reference point Pr moves from the center point P0 to a second end point PEb along a second route RT2*c*. The second route RT2*c* may include sixth, seventh, eighth, ninth and tenth sub-routes R2-1*c*, R2-2*c*, R2-3*c*, R2-4*c*, and R2-5*c*. The shapes of the sixth to tenth sub-routes R2-1*c*, R2-2*c*, R2-3*c*, R2-4*c*, and R2-5*c* may be similar to the shapes of the sixth to tenth sub-routes R2-1, R2-2, R2-3, R2-4, and R2-5 illustrated in FIG. 8A.

Figure 12A:
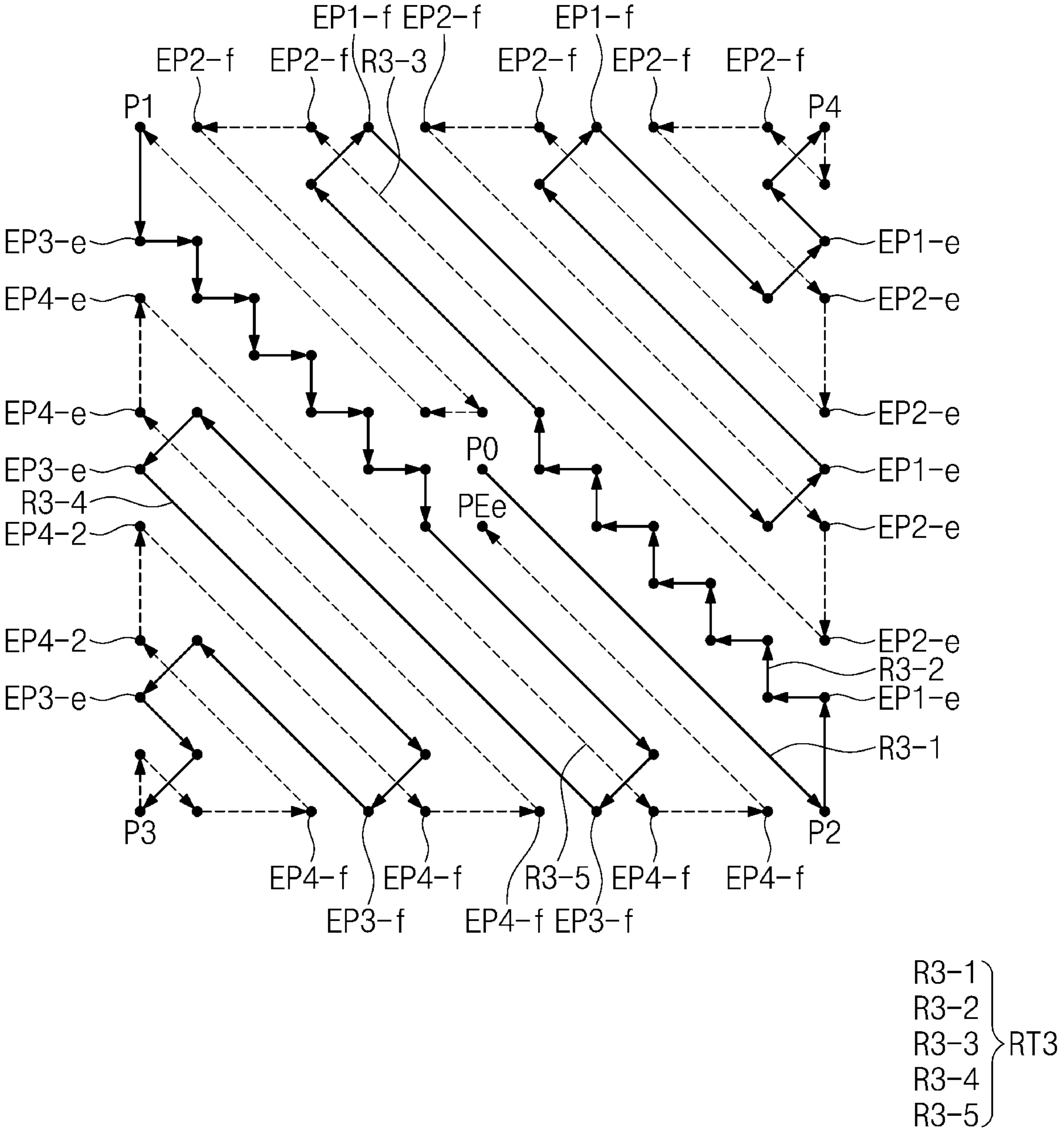
FIGS. 12A and 12B are views illustrating third and fourth routes applied to a first route region according to an embodiment of the present disclosure.
Figure 12B:
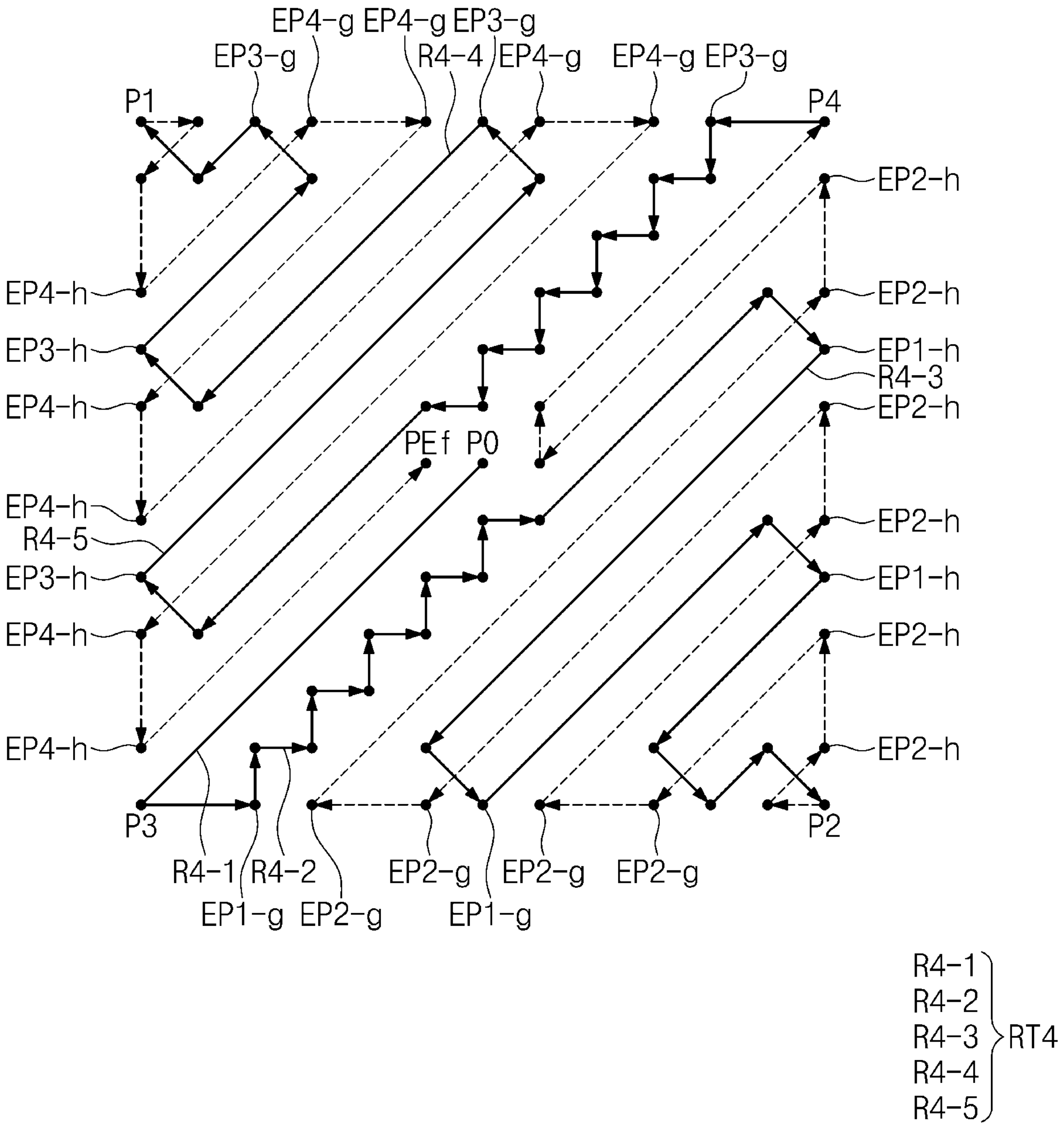

FIGS. 12A and 12B are views for explaining third and fourth routes according to an embodiment of the present disclosure.

Although FIGS. 7A and 7B illustrate the structure in which two routes (e.g., the first and second routes RT1 and RT2) are alternately repeated, the present disclosure is not limited thereto. In an image shift operation, three or four routes may be alternately repeated. FIGS. 12A and 12B illustrate third and fourth routes RT3 and RT4. In a case in which four routes are alternately repeated, the third route RT3 starts after the second route RT2 ends, and the fourth route RT4 starts when the third route RT3 ends. The first route RT1 may start again when the fourth route RT4 ends.

Referring to FIG. 12A, the third route RT3 may be a route along which a reference point Pr moves in the order of a center point P0, a second point P2, a fourth point P4, a first point P1, a third point P3, and a third end point PEe. The third route RT3 may include eleventh, twelfth, thirteenth, fourteenth and fifteenth sub-routes R3-1, R3-2, R3-3, R3-4, and R3-5. In an embodiment of the present disclosure, the eleventh to fifteenth sub-routes R3-1, R3-2, R3-3, R3-4, and R3-5 may have shapes obtained by rotating the sixth to tenth sub-routes R2-1, R2-2, R2-3, R2-4, and R2-5 by a preset angle (e.g., 90° in the clockwise direction).

The eleventh sub-route R3-1 is a route along which the reference point Pr moves from the center point P0 to the second point P2. The eleventh sub-route R3-1 may be located on a first diagonal line connecting the first point P1 and the second point P2. The twelfth sub-route R3-2 is a route along which the reference point Pr moves from the second point P2 to the fourth point P4. Routes passing through first edge points EP1-*e* and EP1-*f* located on third and fourth sides L3 and L4 (refer to FIG. 6A) may be included in the twelfth sub-route R3-2. When the reference point Pr moves along the twelfth sub-route R3-2, the reference point Pr may alternately pass through the first-first edge points EP1-*e* located on the third side L3 and the first-second edge points EP1-*f* located on the fourth side L4.

The thirteenth sub-route R3-3 is a route along which the reference point Pr moves from the fourth point P4 to the first point P1. The thirteenth sub-route R3-3 is denoted by dashed lines in FIG. 12A. Routes passing through second edge points EP2-*e* and EP2-*f* located on the third and fourth sides L3 and L4 may be included in the thirteenth sub-route R3-3. When the reference point Pr moves along the thirteenth sub-route R3-3, the reference point Pr may alternately pass through second-first edge points EP2-*e* located on the third side L3 and second-second edge points EP2-*f* located on the fourth side L4. On the third and fourth sides L3 and L4, the first edge points EP1-*e* and EP1-*f* may be located at points different from the second edge points EP2-*e* and EP2-*f*. Accordingly, an overlapping point may not occur between the twelfth sub-route R3-2 and the thirteenth sub-route R3-3. In other words, an overlapping edge point may not occur between the twelfth sub-route R3-2 and the thirteenth sub-route R3-3.

The fourteenth sub-route R3-4 is a route along which the reference point Pr moves from the first point P1 to the third point P3. Routes passing through third edge points EP3-*e* and EP3-*f* located on first and second sides L1 and L2 (refer to FIG. 6A) may be included in the fourteenth sub-route R3-4. When the reference point Pr moves along the fourteenth sub-route R3-4, the reference point Pr may alternately pass through third-first edge points EP3-*e* located on the first side L1 and third-second edge points EP3-*f* located on the second side L2.

The fifteenth sub-route R3-5 is a route along which the reference point Pr moves from the third point P3 to the third end point PEe adjacent to the center point P0. The fifteenth sub-route R3-5 is also denoted by dashes in FIG. 12A. Routes passing through fourth edge points EP4-*e* and EP4-*f* located on the first and second sides L1 and L2 may be included in the fifteenth sub-route R3-5. When the reference point Pr moves along the fifteenth sub-route R3-5, the reference point Pr may alternately pass through fourth-first edge points EP4-*e* located on the first side L1 and fourth-second edge points EP4-*f* located on the second side L2. On the first and second sides L1 and L2, the third edge points EP3-*e* and EP3-*f* may be located at points different from the fourth edge points EP4-*e* and EP4-*f*. Accordingly, an overlapping point may not occur between the fourteenth sub-route R3-4 and the fifteenth sub-route R3-5. In other words, an overlapping edge point may not occur between the fourteenth sub-route R3-4 and the fifteenth sub-route R3-5.

The third route RT3 may end when the reference point Pr moves from the center point P0 to the third end point PEe. The fourth route RT4 may start from the center point P0 when the third route RT3 ends.

Referring to FIG. 12B, the fourth route RT4 may be a route along which the reference point Pr moves in the order of the center point P0, the third point P3, the second point P2, the fourth point P4, the first point P1, and a fourth end point PEf. The fourth route RT4 may include sixteenth, seventeenth, eighteenth, nineteenth and twentieth sub-routes R4-1, R4-2, R4-3, R4-4, and R4-5. In an embodiment of the present disclosure, the sixteenth to twentieth sub-routes R4-1, R4-2, R4-3, R4-4, and R4-5 may have shapes obtained by rotating the eleventh to fifteenth sub-routes R3-1, R3-2, R3-3, R3-4, and R3-5 by a preset angle (e.g., 90° in the clockwise direction).

The sixteenth sub-route R4-1 is a route along which the reference point Pr moves from the center point P0 to the third point P3. The sixteenth sub-route R4-1 may be located on a second diagonal line connecting the third point P3 and the fourth point P4. The seventeenth sub-route R4-2 is a route along which the reference point Pr moves from the third point P3 to the second point P2. A portion of the seventeenth sub-route R4-2 may have a step-wise shape. Routes passing through first edge points EP1-*g* and EP1-*h* located on the second and third sides L2 and L3 (refer to FIG. 6A) may be included in the seventeenth sub-route R4-2. When the reference point Pr moves along the seventeenth sub-route R4-2, the reference point Pr may alternately pass through first-first edge points EP1-*g* located on the second side L2 and the first-second edge points EP1-*h* located on the third side L3.

The eighteenth sub-route R4-3 is a route along which the reference point Pr moves from the second point P2 to the fourth point P4. Routes passing through second edge points EP2-*g* and EP2-*h* located on the second and third sides L2 and L3 may be included in the eighteenth sub-route R4-3. When the reference point Pr moves along the eighteenth sub-route R4-3, the reference point Pr may alternately pass through second-second edge points EP2-*h* located on the third side L3 and second-first edge points EP2-*g* located on the second side L2. On the second and third sides L2 and L3, the first edge points EP1-*g* and EP1-*h* may be located at points different from the second edge points EP2-*g* and EP2-*h*. Accordingly, an overlapping point may not occur between the seventeenth sub-route R4-2 and the eighteenth sub-route R4-3.

The nineteenth sub-route R4-4 is a route along which the reference point Pr moves from the fourth point P4 to the first point P1. A portion of the nineteenth sub-route R4-4 may have a step-wise shape. Routes passing through third edge points EP3-*g* and EP3-*h* located on first and fourth sides L1 and L4 (refer to FIG. 6A) may be included in the nineteenth sub-route R4-4. When the reference point Pr moves along the nineteenth sub-route R4-4, the reference point Pr may alternately pass through third-first edge points EP3-*g* located on the fourth side L4 and third-second edge points EP3-*h* located on the first side L1.

The twentieth sub-route R4-5 is a route along which the reference point Pr moves from the first point P1 to the fourth end point PEf adjacent to the center point P0. Routes passing through fourth edge points EP4-*g* and EP4-*h* located on the first and fourth sides L1 and L4 may be included in the twentieth sub-route R4-5. When the reference point Pr moves along the twentieth sub-route R4-5, the reference point Pr may alternately pass through the fourth-first edge points EP4-*g* located on the fourth side L4 and the fourth-second edge points EP4-*h* located on the first side L1. On the first and fourth sides L1 and L4, the third edge points EP3-*g* and EP3-*h* may be located at points different from the fourth edge points EP4-*g* and EP4-*h*. Accordingly, an overlapping point may not occur between the nineteenth sub-route R4-4 and the twentieth sub-route R4-5.

The fourth route RT4 may end when the reference point Pr moves from the center point P0 to the fourth end point PEf. The first route RT1 may start again from the center point P0 when the fourth route RT4 ends.

Although the image shift operation in which the first to fourth routes RT1 to RT4 among the plurality of routes are alternately repeated has been described with reference to FIGS. 7A, 7B, 12A, and 12B, the present disclosure is not limited thereto. For example, an image shift operation may be executed such that three routes or five routes are repeated.

Figure 13:
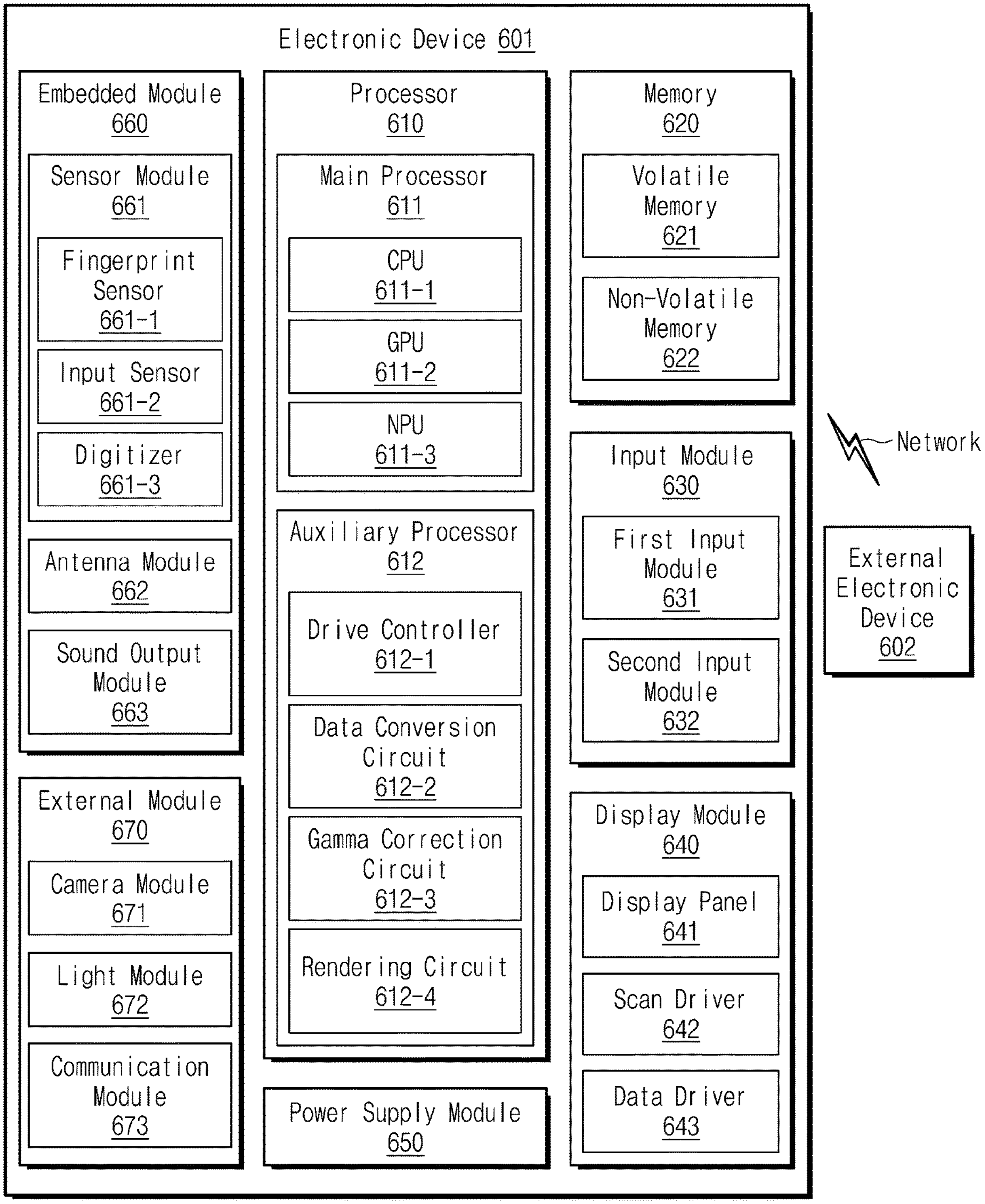
FIG. 13 is a block diagram of an electronic device according to an embodiment of the present disclosure.

FIG. 13 is a block diagram of an electronic device according to an embodiment of the present disclosure.

Referring to FIG. 13, the electronic device 601 outputs various pieces of information through a display module 640 in an operating system. When a processor 610 executes an application stored in a memory 620, the display module 640 provides application information to a user through a display panel 641.

The processor 610 obtains an external input through an input module 630 or a sensor module 661 and executes an application corresponding to the external input. For example, when the user selects a camera icon displayed on the display panel 641, the processor 610 obtains a user input through an input sensor 661-2 and activates a camera module 671. The processor 610 transfers image data corresponding to a photographed image obtained through the camera module 671 to the display module 640. The display module 640 may display an image corresponding to the photographed image through the display panel 641.

In another example, when personal information authentication is executed on the display module 640, a fingerprint sensor 661-1 obtains input fingerprint information as input data. The processor 610 compares the input data obtained through the fingerprint sensor 661-1 with authentication data stored in the memory 620 and executes an application depending on the comparison result. The display module 640 may display information executed depending on the logic of the application through the display panel 641.

In another example, when a music streaming icon displayed on the display module 640 is selected, the processor 610 obtains a user input through the input sensor 661-2 and activates a music steaming application stored in the memory 620. When a music execution command is input in the music streaming application, the processor 610 activates a sound output module 663 and provides sound information corresponding to the music execution command to the user.

Hereinabove, the operations of the electronic device 601 have been briefly described. Hereinafter, components of the electronic device 601 will be described in detail. Some of the components of the electronic device 601 that will be described below may be integrated and provided as one component, or one component may be separated into two or more components.

Referring to FIG. 13, the electronic device 601 may communicate with an external electronic device 602 through a network (e.g., a short-range wireless communication network or a long-range wireless communication network).

According to an embodiment, the electronic device 601 may include the processor 610, the memory 620, the input module 630, the display module 640, a power supply module 650, an embedded module 660, and an external module 670. According to an embodiment, at least one of the above-described components may be omitted from the electronic device 601, or one or more other components may be added to the electronic device 601. According to an embodiment, among the above-described components, some components (e.g., the sensor module 661, an antenna module 662, or the sound output module 663) may be integrated into another component (e.g., the display module 640).

The processor 610 may execute software to control at least one other component (e.g., a hardware or software component) of the electronic device 601 connected to the processor 610 and may perform various data processing or computation. According to an embodiment, as at least part of the data processing or computation, the processor 610 may store commands or data received from another component (e.g., the input module 630, the sensor module 661, or a communication module 673) in a volatile memory 621 and may process the commands or data stored in the volatile memory 621, and result data may be stored in a non-volatile memory 622.

The processor 610 may include a main processor 611 and an auxiliary processor 612. The main processor 611 may include at least one of a central processing unit (CPU) 611-1 and an application processor (AP). The main processor 611 may further include at least one of a graphic processing unit (GPU) 611-2, a communication processor (CP), and an image signal processor (ISP). The main processor 611 may further include a neural processing unit (NPU) 611-3. The neural processing unit may be a processor specialized in processing an artificial intelligence model, and the artificial intelligence model may be generated through machine learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. Additionally or alternatively, the artificial intelligence model may include a software structure other than the hardware structure. At least two of the processing units and the processors described above may be implemented as one integrated component (e.g., a single chip) or may be implemented as independent components (e.g., a plurality of chips).

The auxiliary processor 612 may include a drive controller 612-1. The drive controller 612-1 may include an interface conversion circuit and a timing control circuit. The drive controller 612-1 receives an image signal from the main processor 611, converts the data format of the image signal according to interface specifications with the display module 640, and outputs image data. The drive controller 612-1 may output various control signals required for driving the display module 640. A configuration of the drive controller 612-1 is substantially similar to that of the drive controller 100 illustrated in FIG. 3, and therefore detailed description thereabout will be omitted.

The auxiliary processor 612 may further include a data conversion circuit 612-2, a gamma correction circuit 612-3, and a rendering circuit 612-4. The data conversion circuit 612-2 may receive image data from the drive controller 612-1 and may compensate for the image data based on characteristics of the electronic device 601 or the user's settings such that an image is displayed with desired luminance, or may convert the image data to reduce power consumption or compensate for image persistence. The gamma correction circuit 612-3 may convert image data or a gamma reference voltage such that an image displayed on the electronic device 601 has desired gamma characteristics. The rendering circuit 612-4 may receive image data from the drive controller 612-1 and may render the image data according to a pixel arrangement of the display panel 641 applied to the electronic device 601. At least one of the data conversion circuit 612-2, the gamma correction circuit 612-3, and the rendering circuit 612-4 may be integrated into another component (e.g., the main processor 611 or the drive controller 612-1). At least one of the data conversion circuit 612-2, the gamma correction circuit 612-3, and the rendering circuit 612-4 may be integrated into a data driver 643 that will be described below.

The memory 620 may store various data used by at least one component (e.g., the processor 610 or the sensor module 661) of the electronic device 601 and input data or output data for commands related to the various data. The memory 620 may include at least one of the volatile memory 621 and the non-volatile memory 622.

The input module 630 may receive a command or data to be used for a component (e.g., the processor 610, the sensor module 661, or the sound output module 663) of the electronic device 601 from outside the electronic device 601 (e.g., the user or the external electronic device 602).

The input module 630 may include a first input module 631 to which a command or data is input from the user and a second input module 632 to which a command or data is input from the external electronic device 602. The first input module 631 may include a microphone, a mouse, a keyboard, a key (e.g., a button), or a pen (e.g., a passive pen or an active pen). The second input module 632 may support a specified protocol for wired or wireless connection with the external electronic device 602. According to an embodiment, the second input module 632 may include a high definition multimedia interface (HDMI), a universal serial bus (USB) interface, a secure digital (SD) card interface, or an audio interface. The second input module 632 may include a connector for physical connection with the external electronic device 602, for example, an HDMI connector, a USB connector, an SD card connector, or an audio connector (e.g., a headphone connector).

The display module 640 visually provides information to the user. The display module 640 may include the display panel 641, a scan driver 642, and the data driver 643. The display module 640 may further include a window, a chassis, or a bracket for protection of the display panel 641. The display module 640 may further include an emission driver and a voltage generator. The voltage generator may output various voltages (e.g., the first and second drive voltages ELVDD and ELVSS, refer to FIG. 3) required for driving the display panel 641. Configurations of the display panel 641, the scan driver 642, the data driver 643, and the voltage generator are substantially similar to those of the display panel DP, the scan drive circuit 300, and the source drive circuit 200 illustrated in FIG. 3, and therefore detailed descriptions thereabout will be omitted.

The power supply module 650 supplies power to components of the electronic device 601. The power supply module 650 may include a battery that charges a power supply voltage. The battery may include a primary cell that is not rechargeable, a secondary cell that is rechargeable, or a fuel cell. The power supply module 650 may include a power management integrated circuit (PMIC). The PMIC supplies power optimized for each of the modules described above and modules to be described below. The power supply module 650 may include a wireless power transmission/reception member electrically connected with the battery. The wireless power transmission/reception member may include a plurality of antenna radiators having a coil form.

The electronic device 601 may further include the embedded module 660 and the external module 670. The embedded module 660 may include the sensor module 661, the antenna module 662, and the sound output module 663. The external module 670 may include the camera module 671, a light module 672, and the communication module 673.

The sensor module 661 may sense an input by a part of the user's body or an input by a pen of the first input module 631 and may generate an electrical signal or a data value that corresponds to the input. The sensor module 661 may include at least one of the fingerprint sensor 661-1, the input sensor 661-2, and a digitizer 661-3.

The fingerprint sensor 661-1 may generate a data value corresponding to a fingerprint of the user. The fingerprint sensor 661-1 may include one of a fingerprint sensor of an optical type or a fingerprint sensor of a capacitive type.

The input sensor 661-2 may generate a data value corresponding to coordinate information of an input by a part of the user's body or an input by a pen. The input sensor 661-2 generates the data value based on a change in capacitance caused by the input. The input sensor 661-2 may sense an input by a passive pen, or may transmit/receive data with an active pen.

The input sensor 661-2 may measure a biometric signal such as blood pressure, moisture, or body fat. For example, when the user brings a part of the user's body into contact with a sensor layer or a sensing panel and does not move for a certain period of time, the input sensor 661-2 may sense a biometric signal based on a change in an electric field caused by the part of the user's body and may output information desired by the user to the display module 640.

The digitizer 661-3 may generate a data value corresponding to coordinate information of an input by a pen. The digitizer 661-3 generates the data value based on a change in electromagnetism caused by the input. The digitizer 661-3 may sense an input by a passive pen, or may transmit/receive data with an active pen.

At least one of the fingerprint sensor 661-1, the input sensor 661-2, and the digitizer 661-3 may be implemented with a sensor layer formed on the display panel 641 through a continuous process. The fingerprint sensor 661-1, the input sensor 661-2, and the digitizer 661-3 may be disposed on an upper side of the display panel 641, and one of the fingerprint sensor 661-1, the input sensor 661-2, and the digitizer 661-3, for example, the digitizer 661-3 may be disposed on a lower side of the display panel 641.

At least two of the fingerprint sensor 661-1, the input sensor 661-2, and the digitizer 661-3 may be integrated into one sensing panel through the same process. When the at least two of the fingerprint sensor 661-1, the input sensor 661-2, and the digitizer 661-3 are integrated into the one sensing panel, the sensing panel may be disposed between the display panel 641 and a window disposed on the display panel 641. According to an embodiment, the sensing panel may be disposed on the window, but the position of the sensing panel is not particularly limited.

At least one of the fingerprint sensor 661-1, the input sensor 661-2, and the digitizer 661-3 may be embedded in the display panel 641. For example, at least one of the fingerprint sensor 661-1, the input sensor 661-2, and the digitizer 661-3 may be simultaneously formed through a process of forming elements (e.g., a light emitting element and a transistor) included in the display panel 641.

In addition, the sensor module 661 may generate an electrical signal or a data value that corresponds to a state inside the electronic device 601 or a state external to the electronic device 601. The sensor module 661 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biosensor, a temperature sensor, a humidity sensor, or an illuminance sensor.

The antenna module 662 may include one or more antennas for transmitting a signal or power to the outside or receiving a signal or power from the outside. According to an embodiment, the communication module 673 may transmit or receive a signal to or from the external electronic device 602 through an antenna appropriate for a communication scheme. An antenna pattern of the antenna module 662 may be integrated into one component (e.g., the display panel 641) of the display module 640 or the input sensor 661-2.

The sound output module 663 may output a sound signal to the outside of the electronic device 601. For example, the sound output module 663 may include a speaker and a receiver. The speaker may be used for general purposes such as playing multimedia and playing recordings, and the receiver may be used for incoming calls. According to an embodiment, the receiver may be integrally formed with the speaker, or may be formed separately from the speaker. A sound output pattern of the sound output module 663 may be integrated into the display module 640.

The camera module 671 may take a still image and a video. According to an embodiment, the camera module 671 may include one or more lenses, an image sensor, or an image signal processor. The camera module 671 may further include an infrared camera capable of measuring a presence or absence of the user, the location of the user, and a gaze of the user.

The light module 672 may provide light. The light module 672 may include a light emitting diode or a xenon lamp. The light module 672 may operate in conjunction with the camera module 671, or may operate independently of the camera module 671.

The communication module 673 may support establishing a wired or wireless communication channel between the electronic device 601 and the external electronic device 602 and may support performing communication via the established communication channel. The communication module 673 may include either or both of a wireless communication module, such as a cellular communication module, a short-range wireless communication module, or a global navigation satellite system (GNSS) communication module, and a wired communication module, such as a local area network (LAN) communication module or a power line communication module. The communication module 673 may communicate with the external electronic device 602 through a short-range communication network, such as Bluetooth, WiFi, or infrared data association (IrDA), or a long-range communication network, such as a cellular network, the Internet, or a computer network (e.g., LAN or WAN). The above-described various types of communication modules 673 may be implemented with one chip, or may be implemented with separate chips, respectively.

The input module 630, the sensor module 661, and the camera module 671 may be used to control an operation of the display module 640 in conjunction with the processor 610.

The processor 610 outputs a command or data to the display module 640, the sound output module 663, the camera module 671, or the light module 672, based on input data received from the input module 630. For example, the processor 610 may generate image data corresponding to input data applied through a mouse or an active pen and may output the generated image data to the display module 640. In addition, the processor 610 may generate command data corresponding to the input data applied through the mouse or the active pen and may output the generated command data to the camera module 671 or the light module 672. When input data is not received from the input module 630 for a certain period of time, the processor 610 may switch an operating mode of the electronic device 601 to a low-power mode or a sleep mode to reduce power consumed by the electronic device 601.

The processor 610 outputs a command or data to the display module 640, the sound output module 663, the camera module 671, or the light module 672, based on sensing data received from the sensor module 661. For example, the processor 610 may compare authentication data applied by the fingerprint sensor 661-1 with authentication data stored in the memory 620 and may execute an application depending on the comparison result. The processor 610 may execute a command or may output corresponding image data to the display module 640, based on sensing data sensed by the input sensor 661-2 or the digitizer 661-3. When a temperature sensor is included in the sensor module 661, the processor 610 may receive temperature data on measured temperature from the sensor module 661 and may additionally execute luminance correction for image data, based on the temperature data.

The processor 610 may receive measurement data on a presence or absence of the user, the location of the user, and a gaze of the user from the camera module 671. The processor 610 may additionally execute luminance correction for image data, based on the measurement data. For example, the processor 610 may determine a presence or absence of the user through an input from the camera module 671 and may output, to the display module 640, image data whose luminance is corrected through the data conversion circuit 612-2 or the gamma correction circuit 612-3.

Some of the components described above may be connected together through an inter-peripheral communication scheme, for example, a bus, a general purpose input/output (GPIO), a serial peripheral interface (SP1), a mobile industry processor interface (MIPI), or a ultra path interconnect (UPI) link and may exchange signals (e.g., commands or data) with one another. The processor 610 may communicate with the display module 640 through an agreed interface. For example, the processor 610 may use one of the above-described communication schemes and is not limited to the above-described communication schemes.

The electronic device 601 according to the various embodiments disclosed herein may include various types of devices. For example, the electronic device 601 may include at least one of a portable communication device (e.g., a smart phone), a computer device, a portable multimedia device, a portable medical device, a camera, a wearable device, and a home appliance. The electronic device 601 according to the embodiments of the present disclosure is not limited to the aforementioned devices.

According to embodiments of the present disclosure, each of the plurality of routes may enable the reference point to rapidly move to the edge points located on the edges of the route region and may prevent the reference point from repeatedly passing through a specific point. Accordingly, stress applied to pixels located in the route region may be maximally distributed (e.g., evenly distributed), and the shift period (e.g., the time from when one route starts to when the one route ends) may be minimized.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a display region configured to display an image and a route region located in the display region; and a drive controller configured to generate image data such that a reference point of the image is shifted along a shift route in the route region, wherein the route region includes a center point, first and second points located on a first diagonal line with respect to the center point, third and fourth points located on a second diagonal line with respect to the center point, a first side between the first and third points, a second side between the third and second points, a third side between the second and fourth points, and a fourth side between the fourth and first points, wherein the shift route includes a plurality of routes, and wherein among the plurality of routes, a first route includes:

a first sub-route along which the reference point moves from the center point to the first point;

a second sub-route along which the reference point moves from the first point to the third point via first edge points located on the first and second sides;

a third sub-route along which the reference point moves from the third point to the second point via second edge points located on the first and second sides;

a fourth sub-route along which the reference point moves from the second point to the fourth point via third edge points located on the third and fourth sides; and a fifth sub-route along which the reference point moves from the fourth point to an end point adjacent to the center point via fourth edge points located on the third and fourth sides.

2. The display device of claim 1, wherein on the first and second sides, the first edge points are different from the second edge points, and on the third and fourth sides, the third edge points are different from the fourth edge points.

3. The display device of claim 1, wherein the first sub-route is a route along which the reference point moves to first diagonal points located on the first diagonal line.

4. The display device of claim 3, wherein the second sub-route includes:

a second-first sub-route along which the reference point moves from the first point to a first intermediate point in a stepwise manner;

a second-second sub-route along which the reference point moves from the first intermediate point to one of first-second edge points on the second side;

a second-third sub-route along which the reference point moves from one of the first-second edge points on the second side to one of first-first edge points on the first side; and a second-fourth sub-route along which the reference point moves from one of the first-first edge points on the first side to one of the first-second edge points on the second side.

5. The display device of claim 4, wherein the third sub-route includes:

a third-first sub-route along which the reference point moves from one of second-second edge points on the second side to one of second-first edge points on the first side; and a third-second sub-route along which the reference point moves from one of the second-first edge points on the first side to one of the second-second edge points on the second side, wherein the third-first sub-route has an intersection with the second-third sub-route, and wherein the third-second sub-route has an intersection with one of the second-second sub-route and the second-fourth sub-route.

6. The display device of claim 5, wherein the second-second sub-route and the second-third sub-route each include a portion parallel to the first diagonal line, and wherein the third-first sub-route and the third-second sub-route are parallel to the first diagonal line.

7. The display device of claim 5, wherein the third sub-route further includes:

a third-third sub-route along which the reference point moves along the second-second edge points on the second side; and a third-fourth sub-route along which the reference point moves along the second-first edge points on the first side, wherein the third-third sub-route is connected to the third-first sub-route or the third-second sub-route, and wherein the third-fourth sub-route is connected to the third-first sub-route or the third-second sub-route.

8. The display device of claim 5, wherein the fourth sub-route includes:

a fourth-first sub-route along which the reference point moves from the second point to a second intermediate point in a stepwise manner;

a fourth-second sub-route along which the reference point moves from the second intermediate point to one of third-second edge points on the fourth side; and a fourth-third sub-route along which the reference point moves from one of the third-second edge points on the fourth side to one of third-first edge points on the third side.

9. The display device of claim 8, wherein the fifth sub-route includes:

a fifth-first sub-route along which the reference point moves from one of fourth-second edge points on the fourth side to one of fourth-first edge points on the third side; and a fifth-second sub-route along which the reference point moves from one of the fourth-first edge points on the third side to one of the fourth-second edge points on the fourth side, wherein the fifth-first sub-route has an intersection with the fourth-second sub-route, and wherein the fifth-second sub-route has an intersection with the fourth-third sub-route.

10. The display device of claim 9, wherein the fourth-second sub-route and the fourth-third sub-route each include a portion parallel to the first diagonal line, and wherein the fifth-first sub-route and the fifth-second sub-route are parallel to the first diagonal line.

11. The display device of claim 5, wherein the third sub-route further includes:

a third-fifth sub-route along which the reference point moves from a third intermediate point to the second point in a stepwise manner.

12. The display device of claim 11, wherein the fourth sub-route includes:

a fourth-first sub-route along which the reference point moves along the third side;

a fourth-second sub-route along which the reference point moves from one of third-first edge points on the third side to one of third-second edge points on the fourth side; and a fourth-third sub-route along which the reference point moves from one of the third-second edge points on the fourth side to one of the third-first edge points on the third side.

13. The display device of claim 12, wherein the fifth sub-route includes:

a fifth-first sub-route along which the reference point moves from one of fourth-second edge points on the fourth side to one of fourth-first edge points on the third side; and a fifth-second sub-route along which the reference point moves from one of the fourth-first edge points on the third side to one of the fourth-second edge points on the fourth side, wherein the fifth-first sub-route has an intersection with the fourth-third sub-route, and wherein the fifth-second sub-route has an intersection with the fourth-second sub-route.

14. The display device of claim 13, wherein the fourth-second sub-route and the fourth-third sub-route each include a portion parallel to the first diagonal line, and wherein the fifth-first sub-route and the fifth-second sub-route are parallel to the first diagonal line.

15. The display device of claim 1, wherein the first sub-route is a route along which the reference point moves from the center point to the first point in a stepwise manner.

16. The display device of claim 15, wherein the second sub-route includes:

a second-first sub-route along which the reference point moves from the first point to a first intermediate point in a stepwise manner;

a second-second sub-route along which the reference point moves from the first intermediate point to the third side;

a second-third sub-route along which the reference point moves from the third side to the fourth side; and a second-fourth sub-route along which the reference point moves from the fourth side to the third side.

17. The display device of claim 16, wherein the third sub-route includes:

a third-first sub-route along which the reference point moves from the fourth side to the third side; and a third-second sub-route along which the reference point moves from the third side to the fourth side, wherein the third-first sub-route has an intersection with the second-fourth sub-route, and wherein the third-second sub-route has an intersection with the second-third sub-route.

18. The display device of claim 17, wherein the third sub-route further includes:

a third-third sub-route along which the reference point moves along the second side; and a third-fourth sub-route along which the reference point moves along the first side, wherein the third-third sub-route is connected to the third-first sub-route or the third-second sub-route, and wherein the third-fourth sub-route is connected to the third-first sub-route or the third-second sub-route.

19. The display device of claim 17, wherein the fourth sub-route includes:

a fourth-first sub-route along which the reference point moves from the second point to a second intermediate point;

a fourth-second sub-route along which the reference point moves from the second intermediate point to the second side; and a fourth-third sub-route along which the reference point moves from the second side to the first side.

20. The display device of claim 19, wherein the fifth sub-route includes:

a fifth-first sub-route along which the reference point moves from the first side to the second side; and a fifth-second sub-route along which the reference point moves from the second side to the first side, wherein the fifth-first sub-route has an intersection with the fourth-third sub-route, and wherein the fifth-second sub-route has an intersection with a fourth-fourth sub-route of the fourth sub-route.

21. The display device of claim 20, wherein the fourth-second sub-route and the fourth-third sub-route each include a portion parallel to the first diagonal line, and wherein the fifth-first sub-route and the fifth-second sub-route are parallel to the first diagonal line.

22. The display device of claim 1, wherein the center point and the end point are spaced apart from each other by a coordinate region, wherein the display panel includes a plurality of pixels, and wherein the coordinate region is a region corresponding to one of the plurality of pixels.

23. The display device of claim 1, wherein among the plurality of routes, a second route includes sixth, seventh, eighth, ninth and tenth sub-routes having shapes obtained by rotating the first, second, third, fourth and fifth sub-routes by a preset angle, respectively and wherein the drive controller alternately shifts the reference point along the first route and the second route.

24. The display device of claim 23, further comprising:

an image shift controller configured to provide the shift route to the drive controller, wherein the image shift controller includes a memory in which coordinate information on the first route and coordinate information on the second route are stored.

25. The display device of claim 1, wherein the route region includes k×k coordinate regions, wherein the center point is a point provided in a central coordinate region located at a center among the k×k coordinate regions, and wherein k is an integer greater than 1.

26. The display device of claim 25, wherein the first to fourth points are points provided in coordinate regions corresponding to first, second, third and fourth corners of the route region, respectively.

27. An electronic device comprising:

a display panel including a display region configured to display an image and a route region located in the display region;

a drive controller configured to receive an image signal and generate image data by converting the image signal such that a reference point of the image is shifted along a shift route in the route region; and a processor configured to provide the image signal to the drive controller, wherein the route region includes a center point, first and second points located on a first diagonal line with respect to the center point, third and fourth points located on a second diagonal line with respect to the center point, a first side between the first and third points, a second side between the third and second points, a third side between the second and fourth points, and a fourth side between the fourth and first points, wherein the shift route includes a plurality of routes, and wherein among the plurality of routes, a first route includes:

a first sub-route along which the reference point moves from the center point to the first point;

a second sub-route along which the reference point moves from the first point to the third point via first edge points located on the first and second sides;

a third sub-route along which the reference point moves from the third point to the second point via second edge points located on the first and second sides;

a fourth sub-route along which the reference point moves from the second point to the fourth point via third edge points located on the third and fourth sides; and a fifth sub-route along which the reference point moves from the fourth point to an end point adjacent to the center point via fourth edge points located on the third and fourth sides.

* * * * *